US010939490B2

(12) United States Patent
Li et al.

(10) Patent No.: US 10,939,490 B2
(45) Date of Patent: Mar. 2, 2021

(54) METHOD FOR ESTABLISHING CLASSIC BLUETOOTH CONNECTION BETWEEN DUAL-MODE BLUETOOTH DEVICES, AND DUAL-MODE BLUETOOTH DEVICE

(71) Applicant: HUAWEI TECHNOLOGIES CO., LTD., Guangdong (CN)

(72) Inventors: Jiaxin Li, Shenzhen (CN); Peng Zhao, Shenzhen (CN); Feng Chen, Shenzhen (CN); Yuanlei Sun, Shenzhen (CN); Xiyu Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 145 days.

(21) Appl. No.: 16/313,801

(22) PCT Filed: Jun. 27, 2016

(86) PCT No.: PCT/CN2016/087365
§ 371 (c)(1),
(2) Date: Dec. 27, 2018

(87) PCT Pub. No.: WO2018/000156
PCT Pub. Date: Jan. 4, 2018

(65) Prior Publication Data
US 2019/0150215 A1    May 16, 2019

(51) Int. Cl.
*H04W 76/16* (2018.01)
*H04W 4/80* (2018.01)
(Continued)

(52) U.S. Cl.
CPC .............. *H04W 76/16* (2018.02); *H04B 7/24* (2013.01); *H04W 4/80* (2018.02); *H04W 4/70* (2018.02);
(Continued)

(58) Field of Classification Search
CPC ....... H04W 76/16; H04W 4/80; H04W 8/005; H04W 88/06; H04W 4/70; H04W 12/003;
(Continued)

(56) References Cited

U.S. PATENT DOCUMENTS 10,548,068 B2 * 1/2020 Lee .................... H04W 48/14
2013/0090061 A1    4/2013 Linde
(Continued)

FOREIGN PATENT DOCUMENTS

CN        103747503 A        4/2014
CN        104467925 A        3/2015
(Continued)

OTHER PUBLICATIONS

International Search Report and Written Opinion issued in International Application No. PCT/CN2016/087365 dated Mar. 22, 2017, 15 pages.
(Continued)

Primary Examiner — Hoang-Chuong Q Vu
(74) Attorney, Agent, or Firm — Fish & Richardson P.C.

(57) ABSTRACT

Embodiments of the present disclosure provide, for example, a Bluetooth connection method, the example method including sending, by a first terminal, a Bluetooth low energy BLE advertising message, where the BLE advertising message includes device information. A second terminal receives the BLE advertising message, and then obtains the device information. The second terminal then matches the device information with prestored device information and, if the device information successfully matches the prestored device information, initiates a classic Bluetooth connection request to the first terminal, where the first terminal then establishes a classic Bluetooth connection to the second terminal. Power consumption of BLE is low.

14 Claims, 8 Drawing Sheets

(51) Int. Cl.
*H04W 4/70* (2018.01)
*H04B 7/24* (2006.01)
*H04W 8/00* (2009.01)
*H04W 88/06* (2009.01)
*H04W 12/00* (2021.01)

(52) U.S. Cl.
CPC .......... *H04W 8/005* (2013.01); *H04W 12/003* (2019.01); *H04W 88/06* (2013.01)

(58) Field of Classification Search
CPC ....... H04W 48/14; H04W 8/22; H04W 48/10; H04W 36/03; H04W 76/18; H04W 76/14; H04W 36/0022; H04W 76/10; H04W 48/16; H04W 52/02; H04W 36/14; H04W 84/18; H04W 92/18; H04W 36/0011; H04B 7/24; Y02D 70/144; Y02D 70/14; Y02D 70/162; Y02D 70/166; Y02D 70/22; Y02D 70/10; Y02D 70/168; Y02D 70/142; Y02D 70/00
See application file for complete search history.

(56) References Cited

U.S. PATENT DOCUMENTS

| | | | |
|---|---|---|---|
| 2014/0073244 A1 | 3/2014 | Ko et al. | |
| 2014/0154987 A1* | 6/2014 | Lee ...................... | H04W 76/11 455/41.2 |
| 2014/0323048 A1 | 10/2014 | Kang et al. | |
| 2014/0342670 A1 | 11/2014 | Kang et al. | |
| 2014/0370811 A1* | 12/2014 | Kang ..................... | H04W 84/18 455/41.2 |
| 2015/0372965 A1 | 12/2015 | Seon et al. | |
| 2016/0095047 A1 | 3/2016 | Lee et al. | |
| 2016/0302060 A1* | 10/2016 | Agardh ............... | H04W 12/003 |
| 2017/0099157 A1* | 4/2017 | Jacobson ............ | H04L 12/4625 |
| 2017/0180152 A1* | 6/2017 | Cink ................... | H04L 12/4625 |
| 2018/0007499 A1* | 1/2018 | Lee ...................... | H04W 84/18 |
| 2018/0103229 A1* | 4/2018 | Yang .................... | H04N 5/232 |
| 2018/0352312 A1* | 12/2018 | Kwon .................. | H04W 76/14 |

FOREIGN PATENT DOCUMENTS

| | | |
|---|---|---|
| CN | 104620514 A | 5/2015 |
| CN | 105144757 A | 12/2015 |
| CN | 105191172 A | 12/2015 |
| EP | 2706726 A2 | 3/2014 |
| WO | 2014185615 A1 | 11/2014 |

OTHER PUBLICATIONS

Extended European Search Report issued in European Application No. 16906560.4 dated May 23, 2019, 10 pages.
Office Action issued in Chinese Application No. 201680077800.0 dated Jun. 3, 2020, 13 pages (With English translation).
Office Action issued in Chinese Application No. 201680077800.0 dated Apr. 26, 2019, 8 pages.

* cited by examiner

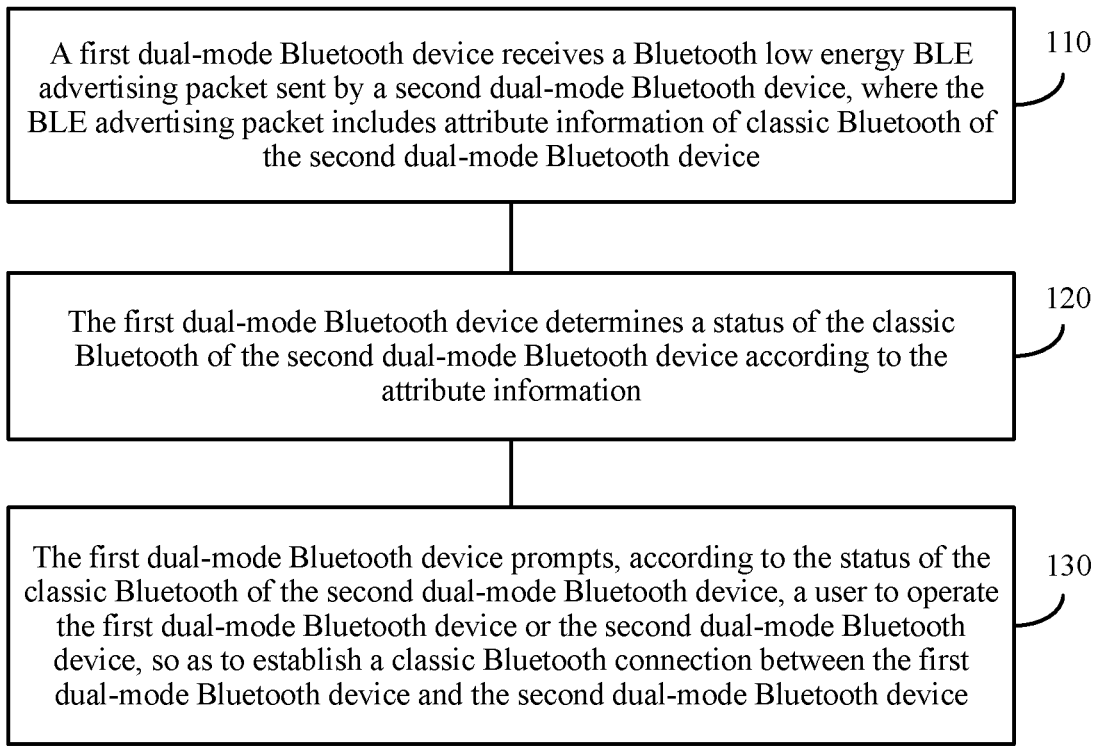

METHOD FOR ESTABLISHING CLASSIC BLUETOOTH CONNECTION BETWEEN DUAL-MODE BLUETOOTH DEVICES, AND DUAL-MODE BLUETOOTH DEVICE

CROSS-REFERENCE TO RELATED APPLICATIONS

This application is a National Stage of International Application No. PCT/CN2016/087365, filed Jun. 27, 2016, which is hereby incorporated by reference in their entireties.

TECHNICAL FIELD

The present invention relates to the wireless communications field, and in particular, to a method for establishing a classic Bluetooth connection between dual-mode Bluetooth devices, and a dual-mode Bluetooth device.

BACKGROUND

A Bluetooth technology is a globally universal short-range wireless communications technology. The Bluetooth technology provides a near-field data communication means, and has advantages such as low costs, low power consumption, and a relatively high transmission rate. A device that supports only a Bluetooth low energy (Bluetooth Low Energy, BLE) connection is referred to as a single-mode Bluetooth device, and a device that supports both a BLE connection and a classic Bluetooth connection is referred to as a dual-mode Bluetooth device. Bluetooth low energy is suitable for short-time transmission with a small amount of data, and classic Bluetooth is suitable for long-time transmission with a large amount of data. Generally, the Bluetooth low energy is more power-saving than the classic Bluetooth.

In actual application, a classic Bluetooth connection usually needs to be established between two dual-mode Bluetooth devices to perform data transmission. For example, when a classic Bluetooth connection needs to be established between two dual-mode Bluetooth devices, that is, a mobile phone and a wristband, the wristband may be searched for and connected by opening an application program (Application, APP) that is in the mobile phone and that is corresponding to the wristband, to establish the classic Bluetooth connection between the mobile phone and the wristband. However, when the wristband is in the following states, the classic Bluetooth connection cannot be established between the mobile phone and the wristband. For example, when the wristband has established a classic Bluetooth connection to another device or classic Bluetooth of the wristband is not enabled, the mobile phone cannot find the wristband; when the wristband does not enter a searchable state, the mobile phone cannot find the wristband; or when the wristband does not enter a connectable state, the mobile phone cannot be connected to the wristband. For the foregoing case, an existing solution is to refer to a manual of the wristband, and establish the classic Bluetooth connection between the mobile phone and the wristband step by step according to steps indicated in the manual. However, this method is relatively complex, and user experience is poor.

SUMMARY

This application provides a method for establishing a classic Bluetooth connection between dual-mode Bluetooth Bluetooth devices, and a dual-mode Bluetooth device, to simplify a procedure of establishing a classic Bluetooth connection, and improve user experience.

According to a first aspect, a method for establishing a classic Bluetooth connection between dual-mode Bluetooth Bluetooth devices is provided, including: receiving, by a first dual-mode Bluetooth device, a Bluetooth low energy BLE advertising packet sent by a second dual-mode Bluetooth device, where the BLE advertising packet includes attribute information of classic Bluetooth of the second dual-mode Bluetooth device; determining, by the first dual-mode Bluetooth device, a status of the classic Bluetooth of the second dual-mode Bluetooth device according to the attribute information; and prompting, by the first dual-mode Bluetooth device according to the status of the classic Bluetooth of the second dual-mode Bluetooth device, a user to operate the first dual-mode Bluetooth device or the second dual-mode Bluetooth device, so as to establish a classic Bluetooth connection between the first dual-mode Bluetooth device and the second dual-mode Bluetooth device.

In this embodiment of the present invention, a dual-mode Bluetooth device may determine a status of classic Bluetooth of another dual-mode Bluetooth device according to attribute information that is of the classic Bluetooth and that is obtained from a BLE advertising packet, and instruct, according to the status of the classic Bluetooth, a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

With reference to the first aspect, in a first implementation of the first aspect, the attribute information includes a Bluetooth address of a peer device to which the classic Bluetooth of the second dual-mode Bluetooth device was connected last time, and the determining, by the first dual-mode Bluetooth device, a status of the classic Bluetooth of the second dual-mode Bluetooth device according to the attribute information includes: determining, by the first dual-mode Bluetooth device according to a relationship between a Bluetooth address of the first dual-mode Bluetooth device and the Bluetooth address of the peer device, whether the classic Bluetooth of the second dual-mode Bluetooth device can establish the classic Bluetooth connection to the first dual-mode Bluetooth device currently; and the prompting, by the first dual-mode Bluetooth device according to the status of the classic Bluetooth, a user to operate the first dual-mode Bluetooth device or the second dual-mode Bluetooth device includes: if the classic Bluetooth of the second dual-mode Bluetooth device cannot establish the classic Bluetooth connection to the first dual-mode Bluetooth device currently, prompting, by the first dual-mode Bluetooth device, the user to perform factory reset on the second dual-mode Bluetooth device.

If the classic Bluetooth of the second dual-mode Bluetooth device cannot establish the classic Bluetooth connection to the first dual-mode Bluetooth device currently, the first dual-mode Bluetooth device may directly prompt the user to operate the second dual-mode Bluetooth device to restore the second dual-mode Bluetooth device to a factory setting, so as to establish the classic Bluetooth connection between the two dual-mode Bluetooth devices.

With reference to the first aspect or the first implementation of the first aspect, in a second implementation of the first aspect, the attribute information includes an enabling status of the classic Bluetooth of the second dual-mode Bluetooth device, and the prompting, by the first dual-mode Bluetooth device according to the status of the classic Bluetooth of the second dual-mode Bluetooth device, a user to operate the first dual-mode Bluetooth device or the second dual-mode Bluetooth device includes: if the classic Bluetooth of the second dual-mode Bluetooth device is disabled, prompting, by the first dual-mode Bluetooth device, the user to enable the classic Bluetooth of the second dual-mode Bluetooth device.

If the classic Bluetooth of the second dual-mode Bluetooth device is disabled, the classic Bluetooth of the second dual-mode Bluetooth device may be conveniently and simply enabled by prompting the user, and then the classic Bluetooth connection between the two dual-mode Bluetooth devices can be established more conveniently.

With reference to the first aspect or the first implementation of the first aspect, in a third implementation of the first aspect, the attribute information includes a searchable status of the classic Bluetooth of the second dual-mode Bluetooth device, and the prompting, by the first dual-mode Bluetooth device according to the status of the classic Bluetooth of the second dual-mode Bluetooth device, a user to operate the first dual-mode Bluetooth device or the second dual-mode Bluetooth device includes: if the classic Bluetooth of the second dual-mode Bluetooth device cannot be searched for, prompting, by the first dual-mode Bluetooth device, the user to set the classic Bluetooth of the second dual-mode Bluetooth device to a searchable state.

When the classic Bluetooth of the second dual-mode Bluetooth device cannot be searched for, the classic Bluetooth of the second dual-mode Bluetooth device is set to a searchable state by prompting the user to operate the second dual-mode Bluetooth device, and then the classic Bluetooth connection between the two dual-mode Bluetooth devices can be established more conveniently.

With reference to the first aspect or the first implementation of the first aspect, in a fourth implementation of the first aspect, the attribute information includes a connectable status of the classic Bluetooth of the second dual-mode Bluetooth device, and the prompting, by the first dual-mode Bluetooth device according to the status of the classic Bluetooth of the second dual-mode Bluetooth device, a user to operate the first dual-mode Bluetooth device or the second dual-mode Bluetooth device includes: if the classic Bluetooth of the second dual-mode Bluetooth device cannot be connected, prompting, by the first dual-mode Bluetooth device, the user to set the classic Bluetooth of the second dual-mode Bluetooth device to a connectable state.

When the classic Bluetooth of the second dual-mode Bluetooth device cannot be connected, the classic Bluetooth of the second dual-mode Bluetooth device is set to a connectable state by prompting the user to operate the second dual-mode Bluetooth device, and then the classic Bluetooth connection between the two dual-mode Bluetooth devices can be established more conveniently.

With reference to any one of the first aspect, or the first to the fourth implementations of the first aspect, in a fifth implementation of the first aspect, the attribute information further includes application program information of the classic Bluetooth of the second dual-mode Bluetooth device, and the method further includes: determining, by the first dual-mode Bluetooth device according to the application program information, an application program corresponding to the classic Bluetooth of the second dual-mode Bluetooth device, where the application program is used to establish the classic Bluetooth connection between the first dual-mode Bluetooth device and the second dual-mode Bluetooth device; and prompting, by the first dual-mode Bluetooth device on an operation interface of the first dual-mode Bluetooth device, the user to open the application program corresponding to the second dual-mode Bluetooth device.

The user is prompted to open the corresponding application program, so that the user can be conveniently prompted to quickly establish the classic Bluetooth connection between the two dual-mode Bluetooth devices.

With reference to the fifth implementation of the first aspect, in a sixth implementation of the first aspect, the application program corresponding to the classic Bluetooth of the second dual-mode Bluetooth device is not installed in the first dual-mode Bluetooth device, and before the prompting, by the first dual-mode Bluetooth device on an operation interface of the first dual-mode Bluetooth device, the user to open the application program corresponding to the classic Bluetooth of the second dual-mode Bluetooth device, the method further includes: prompting, by the first dual-mode Bluetooth device, the user to download and install the application program corresponding to the classic Bluetooth of the second dual-mode Bluetooth device.

The user is prompted to download and install the corresponding application program, so that the user can quickly find the corresponding application program if the application program does not exist. In this way, a time period required for establishing the classic Bluetooth connection between the two dual-mode Bluetooth devices is shortened.

With reference to any one of the first aspect, or the first to the sixth implementations of the first aspect, in a seventh implementation of the first aspect, the method further includes: sending, by the first dual-mode Bluetooth device, another BLE advertising packet to another Bluetooth device, where the another BLE advertising packet includes attribute information of classic Bluetooth of the first dual-mode Bluetooth device.

The first dual-mode Bluetooth device sends the BLE advertising packet to a surrounding Bluetooth device, so that the surrounding Bluetooth device can learn of a status of the classic Bluetooth of the first dual-mode Bluetooth device. This facilitates establishment of a classic Bluetooth connection between the first dual-mode Bluetooth device and another dual-mode Bluetooth device.

According to a second aspect, a method for connecting dual-mode Bluetooth devices is provided, including: generating, by a dual-mode Bluetooth device, a BLE advertising packet, where the BLE advertising packet includes attribute information of classic Bluetooth of the dual-mode Bluetooth device; and sending, by the dual-mode Bluetooth device, the BLE advertising packet, where the attribute information is used by another Bluetooth device to determine a status of the classic Bluetooth of the dual-mode Bluetooth device, so as to establish a classic Bluetooth connection between the dual-mode Bluetooth device and the another Bluetooth device.

In this embodiment of the present invention, the dual-mode Bluetooth device generates the BLE advertising packet including the attribute information of the classic Bluetooth of the dual-mode Bluetooth device, and sends the BLE advertising packet to a surrounding Bluetooth device by using Bluetooth low energy. In this way, the surrounding Bluetooth device may determine the status of the classic Bluetooth of the dual-mode Bluetooth device according to the attribute information of the classic Bluetooth of the dual-mode Bluetooth device, and then instruct a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

With reference to the second aspect, in a first implementation of the second aspect, the attribute information includes a Bluetooth address of a peer device to which the classic Bluetooth of the dual-mode Bluetooth device was connected last time.

With reference to the second aspect or the first implementation of the second aspect, in a second implementation of the second aspect, the attribute information includes an enabling status of the classic Bluetooth of the dual-mode Bluetooth device.

With reference to any one of the second aspect, or the first to the second implementations of the second aspect, in a third implementation of the second aspect, the attribute information includes a searchable status of the classic Bluetooth of the dual-mode Bluetooth device.

With reference to any one of the second aspect, or the first to the third implementations of the second aspect, in a fourth implementation of the second aspect, the attribute information includes a connectable status of the classic Bluetooth of the dual-mode Bluetooth device.

With reference to any one of the second aspect, or the first to the fourth implementations of the second aspect, in a fifth implementation of the second aspect, the attribute information further includes application program information of the classic Bluetooth of the dual-mode Bluetooth device.

According to a third aspect, a dual-mode Bluetooth device is provided, the dual-mode Bluetooth device includes a Bluetooth low energy module, a classic Bluetooth module, and a processing module, and the Bluetooth low energy module, the classic Bluetooth module, and the processing module of the dual-mode Bluetooth device are configured to perform the method in the first aspect.

In this embodiment of the present invention, the dual-mode Bluetooth device may determine a status of classic Bluetooth of another dual-mode Bluetooth device according to attribute information that is of the classic Bluetooth and that is obtained from a BLE advertising packet, and instruct, according to the status of the classic Bluetooth, a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

According to a fourth aspect, a dual-mode Bluetooth device is provided, the dual-mode Bluetooth device includes a classic Bluetooth module, a Bluetooth low energy module, and a control module, and the classic Bluetooth module, the Bluetooth low energy module, and the control module of the dual-mode Bluetooth device are configured to perform the method in the second aspect.

In this embodiment of the present invention, the dual-mode Bluetooth device generates a BLE advertising packet including attribute information of classic Bluetooth of the dual-mode Bluetooth device, and sends the BLE advertising packet to a surrounding Bluetooth device by using Bluetooth low energy. In this way, the surrounding Bluetooth device may determine a status of the classic Bluetooth of the dual-mode Bluetooth device according to the attribute information of the classic Bluetooth of the dual-mode Bluetooth device, and then instruct a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

According to a fifth aspect, a dual-mode Bluetooth device is provided, and the dual-mode Bluetooth device includes: a transceiver, configured to receive a Bluetooth low energy BLE advertising packet sent by another dual-mode Bluetooth device, where the BLE advertising packet includes attribute information of classic Bluetooth of the another dual-mode Bluetooth device; and a processor, configured to determine a status of the classic Bluetooth of the another dual-mode Bluetooth device according to the attribute information, where the processor is further configured to prompt, according to the status of the classic Bluetooth of the another dual-mode Bluetooth device, a user to operate the dual-mode Bluetooth device or the another dual-mode Bluetooth device, so as to establish a classic Bluetooth connection between the dual-mode Bluetooth device and the another dual-mode Bluetooth device.

In this embodiment of the present invention, the dual-mode Bluetooth device may determine the status of the classic Bluetooth of the another dual-mode Bluetooth device according to the attribute information that is of the classic Bluetooth and that is obtained from the BLE advertising packet, and instruct, according to the status of the classic Bluetooth, the user to perform a corresponding operation to establish the classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

With reference to the fifth aspect, in a first implementation of the fifth aspect, the attribute information includes a Bluetooth address of a peer device to which the classic Bluetooth of the another dual-mode Bluetooth device was connected last time, and the processor is specifically configured to: determine, according to a relationship between a Bluetooth address of the dual-mode Bluetooth device and the Bluetooth address of the peer device, whether the classic Bluetooth of the another dual-mode Bluetooth device can establish the classic Bluetooth connection to the dual-mode Bluetooth device currently; and if the classic Bluetooth of the another dual-mode Bluetooth device cannot establish the classic Bluetooth connection to the dual-mode Bluetooth device currently, prompt the user to perform factory reset on the another dual-mode Bluetooth device.

With reference to the fifth aspect or the first implementation of the fifth aspect, in a second implementation of the fifth aspect, the attribute information includes an enabling status of the classic Bluetooth of the another dual-mode Bluetooth device, and the processor is specifically configured to: if the classic Bluetooth of the another dual-mode Bluetooth device is disabled, prompt the user to enable the classic Bluetooth of the another dual-mode Bluetooth device.

With reference to the fifth aspect or the first implementation of the fifth aspect, in a third implementation of the fifth aspect, the attribute information includes a searchable status of the classic Bluetooth of the another dual-mode Bluetooth device, and the processor is specifically configured to: if the classic Bluetooth of the another dual-mode Bluetooth device cannot be searched for, prompt the user to set the classic Bluetooth of the another dual-mode Bluetooth device to a searchable state.

With reference to the fifth aspect or the first implementation of the fifth aspect, in a fourth implementation of the fifth aspect, the attribute information includes a connectable status of the classic Bluetooth of the another dual-mode Bluetooth device, and the processor is specifically configured to: if the classic Bluetooth of the another dual-mode Bluetooth device cannot be connected, prompt the user to set the classic Bluetooth of the another dual-mode Bluetooth device to a connectable state.

With reference to any one of the fifth aspect, or the first to the fourth implementations of the fifth aspect, in a fifth implementation of the fifth aspect, the attribute information further includes application program information of classic Bluetooth of a second dual-mode Bluetooth device, and the processor is further configured to: determine, according to the application program information, an application program corresponding to the classic Bluetooth of the another dual-mode Bluetooth device, where the application program is used to connect the dual-mode Bluetooth device to the another dual-mode Bluetooth device; and prompt, on an operation interface of the dual-mode Bluetooth device, the user to open the application program corresponding to the classic Bluetooth of the another dual-mode Bluetooth device.

With reference to the fifth implementation of the fifth aspect, in a sixth implementation of the fifth aspect, the application program corresponding to the classic Bluetooth of the another dual-mode Bluetooth device is not installed in the dual-mode Bluetooth device, and before the processor prompts, on the operation interface of the dual-mode Bluetooth device, the user to open the application program corresponding to the classic Bluetooth of the another dual-mode Bluetooth device, the processor is further configured to prompt the user to download and install the application program corresponding to the classic Bluetooth of the another dual-mode Bluetooth device.

With reference to any one of the fifth aspect, or the first to the sixth implementations of the fifth aspect, in a seventh implementation of the fifth aspect, the transceiver is further configured to send another BLE advertising packet to another Bluetooth device, and the another BLE advertising packet includes attribute information of classic Bluetooth of the dual-mode Bluetooth device.

According to a sixth aspect, a dual-mode Bluetooth device is provided, the dual-mode Bluetooth device includes a processor and a transceiver, and the transceiver and the processor are configured to perform the method in the second aspect.

In this embodiment of the present invention, the dual-mode Bluetooth device generates a BLE advertising packet including attribute information of classic Bluetooth of the dual-mode Bluetooth device, and sends the BLE advertising packet to a surrounding Bluetooth device by using Bluetooth low energy. In this way, the surrounding Bluetooth device may determine a status of the classic Bluetooth of the dual-mode Bluetooth device according to the attribute information of the classic Bluetooth of the dual-mode Bluetooth device, and then instruct a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

According to a seventh aspect, a Bluetooth communications system is provided, and the Bluetooth communications system includes the dual-mode Bluetooth device in the third aspect and the dual-mode Bluetooth device in the fourth aspect.

In this embodiment of the present invention, a dual-mode Bluetooth device generates a BLE advertising packet including attribute information of classic Bluetooth of the dual-mode Bluetooth device, and sends the BLE advertising packet to a surrounding Bluetooth device by using Bluetooth low energy. In this way, another surrounding dual-mode Bluetooth device may determine a status of the classic Bluetooth of the dual-mode Bluetooth device according to the attribute information of the classic Bluetooth of the dual-mode Bluetooth device, and then instruct a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the another dual-mode Bluetooth device, so that a procedure of establishing a classic Bluetooth connection is simplified, and user experience is improved.

According to an eighth aspect, a Bluetooth communications system is provided, and the Bluetooth communications system includes the dual-mode Bluetooth device in the fifth aspect and the dual-mode Bluetooth device in the sixth aspect.

In this embodiment of the present invention, a dual-mode Bluetooth device generates a BLE advertising packet including attribute information of classic Bluetooth of the dual-mode Bluetooth device, and sends the BLE advertising packet to a surrounding Bluetooth device by using Bluetooth low energy. In this way, another surrounding dual-mode Bluetooth device may determine a status of the classic Bluetooth of the dual-mode Bluetooth device according to the attribute information of the classic Bluetooth of the dual-mode Bluetooth device, and then instruct a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the another dual-mode Bluetooth device, so that a procedure of establishing a classic Bluetooth connection is simplified, and user experience is improved.

In this application, the dual-mode Bluetooth device may determine the status of the classic Bluetooth of the another dual-mode Bluetooth device according to the attribute information that is of the classic Bluetooth and that is obtained from the BLE advertising packet, and instruct, according to the status of the classic Bluetooth, the user to perform a corresponding operation to establish the classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a method for establishing a classic Bluetooth connection between dual-mode Bluetooth Bluetooth devices according to an embodiment of the present invention;

FIG. 2 is a structural diagram of a BLE packet;

DESCRIPTION OF EMBODIMENTS

Figure 3:
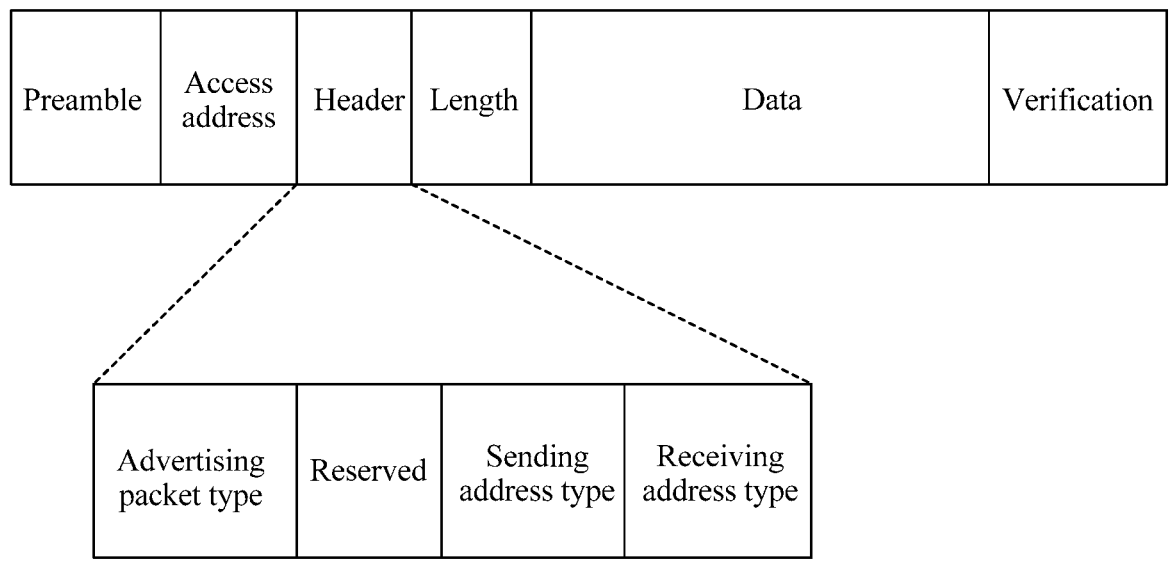
FIG. 3 is a structural diagram of a BLE advertising packet.

The following clearly and completely describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

Bluetooth in the embodiments of the present invention is a wireless communications standard for short-range data exchange, and may include classic Bluetooth and BLE. The classic Bluetooth may also be referred to as conventional Bluetooth or standard Bluetooth. The classic Bluetooth is developed and improved based on Bluetooth in previous Bluetooth specification protocol versions 1.0, 1.2, 2.0+EDR, 2.1+EDR, 3.0+HS, and the like, and is a name generally called after the BLE appears. Compared with the BLE, currently, the classic Bluetooth is more appropriate for transmission with a relatively large amount of data, for example, voice transmission or music transmission. The BLE may also be referred to as Bluetooth Smart or the like, is developed based on the Wibree standard of Nokia, and is originally introduced in the Bluetooth specification protocol version 4.0. The BLE, as the name indicates, consumes extremely low power, and power consumption is 1/10 or less of that of the classic Bluetooth. The BLE is characterized by a short packet, high-efficiency coding, a short connection establishment time period, and the like. For related description of the Bluetooth, refer to related content in Wikipedia at https://en.wikipedia.org/wiki/Bluetooth, and a last visit time is Jun. 25, 2016.

A dual-mode Bluetooth device mentioned in the present invention is a terminal device that supports both a BLE connection and a classic Bluetooth connection. The dual-mode Bluetooth device may be specifically a mobile phone, a watch, a wristband, a tablet, a point of sale (Point of Sales, POS) terminal, an in-vehicle computer, or the like. This is not specifically limited in the embodiments of the present invention.

A Bluetooth low energy connection or a classic Bluetooth connection may be established between dual-mode Bluetooth devices, or both a Bluetooth low energy connection and a classic Bluetooth connection may be established between dual-mode Bluetooth devices. For example, when only a small amount of data needs to be transmitted between a mobile phone and a wristband, only a Bluetooth low energy connection may be established between the mobile phone and the wristband. However, when a large amount of data needs to be transmitted between the mobile phone and the wristband, a classic Bluetooth connection needs to be established between the mobile phone and the wristband. Generally, power consumption of the classic Bluetooth is far higher than power consumption of the Bluetooth low energy. Therefore, when a dual-mode Bluetooth device does not use classic Bluetooth to transmit data, the dual-mode Bluetooth device may disable the classic Bluetooth or set the classic Bluetooth to a sleep state, add attribute information of the classic Bluetooth to a BLE advertising packet, and send the BLE advertising packet to a surrounding Bluetooth device by using Bluetooth low energy. In this way, information related to the classic Bluetooth may be sent to the surrounding Bluetooth device by using the Bluetooth low energy. After receiving the BLE advertising packet, the surrounding Bluetooth device may determine a status of the classic Bluetooth of the Bluetooth device according to the attribute information, and may prompt a user to perform a series of operations to establish a classic Bluetooth connection between the dual-mode Bluetooth device and the surrounding Bluetooth device. In this way, regardless of the status of the classic Bluetooth of the dual-mode Bluetooth device, the surrounding Bluetooth device may learn of the status of the classic Bluetooth of the dual-mode Bluetooth device according to the BLE packet sent by using the Bluetooth low energy, and then establish the classic Bluetooth connection between the dual-mode Bluetooth device and the surrounding Bluetooth device. A method for connecting dual-mode Bluetooth devices in an embodiment of the present invention is described below in detail with reference to FIG. 1 to FIG. 6.

FIG. 1 is a schematic flowchart of a method for establishing a classic Bluetooth connection between dual-mode Bluetooth Bluetooth devices according to an embodiment of the present invention. Specific steps of the method are as follows:

110. A first dual-mode Bluetooth device receives a BLE advertising packet sent by a second dual-mode Bluetooth device, where the BLE advertising packet includes attribute information of classic Bluetooth of the second dual-mode Bluetooth device.

It should be understood that the first dual-mode Bluetooth device and the second dual-mode Bluetooth device are two different Bluetooth devices. Preferably, the first dual-mode Bluetooth device may be a smartphone, and the second dual-mode Bluetooth device may be a wearable device such as a smart band or a smartwatch.

The second dual-mode Bluetooth device may continuously transmit the BLE advertising packet to a surrounding Bluetooth device, or may transmit the BLE advertising packet to a surrounding Bluetooth device after the second dual-mode Bluetooth device is disconnected from classic Bluetooth of another Bluetooth device. When a distance between the first dual-mode Bluetooth device and the second dual-mode Bluetooth device is in a specific range, the first dual-mode Bluetooth device may receive the BLE advertising packet of the second dual-mode Bluetooth device. The attribute information in the BLE advertising packet may specifically include a status of a connection between another Bluetooth device and the classic Bluetooth of the second dual-mode Bluetooth device, information indicating whether the classic Bluetooth of the second dual-mode Bluetooth device is enabled, information indicating whether the classic Bluetooth of the second dual-mode Bluetooth device can be found by the another Bluetooth device, information indicating whether the classic Bluetooth of the second dual-mode Bluetooth device can be connected to the another Bluetooth device, and the like. It should be understood that the second dual-mode Bluetooth device may encrypt information carried in the BLE advertising packet. In this way, after receiving the BLE advertising packet, the another Bluetooth device needs to decrypt the carried information to read corresponding information, so that information transmission security is improved.

In addition, power consumption of Bluetooth low energy is extremely low, but power consumption of the classic Bluetooth is relatively high. Therefore, when the classic Bluetooth does not need to work, the classic Bluetooth may be first disabled, and the attribute information of the classic Bluetooth is sent by using the Bluetooth low energy. In this way, the attribute information of the classic Bluetooth may be sent to the surrounding Bluetooth device without enabling the classic Bluetooth, and power consumption may be further reduced.

It should be understood that the second dual-mode Bluetooth device herein may establish classic Bluetooth connections to multiple Bluetooth devices, or may establish a classic Bluetooth connection to only one single Bluetooth device. Certainly, during implementation, in consideration of data security or the like of the second dual-mode Bluetooth device, the second dual-mode Bluetooth device may be set to a state in which the second dual-mode Bluetooth device can establish a classic Bluetooth connection to only one single Bluetooth device. When the second dual-mode Bluetooth device needs to establish a classic Bluetooth connection to another Bluetooth device, the second dual-mode Bluetooth device first needs to release a classic Bluetooth connection to a current Bluetooth device, and then the second dual-mode Bluetooth device can establish the classic Bluetooth connection to the another Bluetooth device.

120. The first dual-mode Bluetooth device determines a status of the classic Bluetooth of the second dual-mode Bluetooth device according to the attribute information.

The status of the classic Bluetooth of the second dual-mode Bluetooth device includes a status of a connection between another Bluetooth device and the classic Bluetooth of the second dual-mode Bluetooth device, information indicating whether the classic Bluetooth of the second dual-mode Bluetooth device is enabled, a searchable status of the classic Bluetooth of the second dual-mode Bluetooth device, and a connectable status of the classic Bluetooth of the second dual-mode Bluetooth device.

The status of the connection between the another Bluetooth device and the classic Bluetooth of the second dual-mode Bluetooth device includes: the classic Bluetooth of the second dual-mode Bluetooth device has been previously connected to the another Bluetooth device, but is currently disconnected from the another Bluetooth device; or the classic Bluetooth of the second dual-mode Bluetooth device is currently being connected to the another Bluetooth device. The searchable status of the classic Bluetooth of the second dual-mode Bluetooth device indicates whether the classic Bluetooth of the second dual-mode Bluetooth device is in a searchable state. When the classic Bluetooth of the second dual-mode Bluetooth device is in a searchable state, a surrounding Bluetooth device can find the classic Bluetooth of the second dual-mode Bluetooth device; or when the classic Bluetooth of the second dual-mode Bluetooth device is in a non-searchable state, the surrounding Bluetooth device cannot find the classic Bluetooth of the second dual-mode Bluetooth device. The connectable status of the classic Bluetooth of the second dual-mode Bluetooth device indicates whether the classic Bluetooth of the second dual-mode Bluetooth device can be connected to the surrounding Bluetooth device. When the classic Bluetooth of the second dual-mode Bluetooth device is in a connectable state, the surrounding Bluetooth device can establish a classic Bluetooth connection to the second dual-mode Bluetooth device; or when the classic Bluetooth of the second dual-mode Bluetooth device is in a non-connectable state, the surrounding Bluetooth device cannot establish a classic Bluetooth connection to the second dual-mode Bluetooth device.

Specifically, for example, during implementation, whether the classic Bluetooth of the second dual-mode Bluetooth device is in an inquiry scan state may be used to indicate whether the classic Bluetooth of the second dual-mode Bluetooth device is in a searchable state, and whether the classic Bluetooth of the second dual-mode Bluetooth device is in a page scan state may be used to indicate whether the classic Bluetooth of the second dual-mode Bluetooth device is in a connectable state. When the classic Bluetooth of the second dual-mode Bluetooth device is in an inquiry scan state, it may be considered that the classic Bluetooth of the second dual-mode Bluetooth device is in a searchable state. When the classic Bluetooth of the second dual-mode Bluetooth device is in a page scan state, it may be considered that the classic Bluetooth of the second dual-mode Bluetooth device is in a connectable state. It should be understood that, whether the classic Bluetooth of the second dual-mode Bluetooth device is in an inquiry scan state or a page scan state may be controlled by using a corresponding option switch. When the corresponding option switch is enabled, the classic Bluetooth of the second dual-mode Bluetooth device is in an inquiry scan state or a page scan state. When the corresponding option switch is disabled, the classic Bluetooth of the second dual-mode Bluetooth device is not in an inquiry scan state or a page scan state. In addition, when the Bluetooth device is in an inquiry state, the Bluetooth device may search for the surrounding Bluetooth device. When the Bluetooth device is in a page state, the Bluetooth device may initiate a connection request to the surrounding Bluetooth device.

130. The first dual-mode Bluetooth device prompts, according to the status of the classic Bluetooth of the second dual-mode Bluetooth device, a user to operate the first dual-mode Bluetooth device or the second dual-mode Bluetooth device, so as to establish a classic Bluetooth connection between the first dual-mode Bluetooth device and the second dual-mode Bluetooth device.

When the second dual-mode Bluetooth device is in a different state, the user needs to operate the second dual-mode Bluetooth device or the first dual-mode Bluetooth device, or needs to operate both the first dual-mode Bluetooth device and the second dual-mode Bluetooth device, so as to establish the classic Bluetooth connection between the first Bluetooth device and the second dual-mode Bluetooth device.

In this embodiment of the present invention, a dual-mode Bluetooth device may determine a status of classic Bluetooth of another dual-mode Bluetooth device according to attribute information that is of the classic Bluetooth and that is obtained from a BLE advertising packet, and instruct, according to the status of the classic Bluetooth, a user to perform a corresponding operation to establish a classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

Optionally, the BLE advertising packet sent by the second dual-mode Bluetooth device may be specifically an advertising packet in a BLE packet. A structure of the BLE packet is shown in FIG. 2. The BLE packet includes a preamble, an access address, a header, a length, data, and a verification field. Two types of packets: an advertising packet and a data packet, are defined in the Bluetooth low energy specification. Generally, a Bluetooth device may send an advertising packet to a surrounding Bluetooth device. The surrounding Bluetooth device can receive the advertising packet provided that the surrounding Bluetooth device is in an enabled state and is in a specific distance range. A data packet is generally used to transmit data after a connection is established between Bluetooth devices. A difference between the advertising packet and the data packet is that the advertising packet may be used to send data to multiple surrounding listening devices by means of advertising, but the data packet can be understood only by two connected devices. Whether a packet sent by a Bluetooth device is an advertising packet or a data packet depends on a channel for sending the packet. Three advertising channels and 37 data channels are specified in the Bluetooth low energy. If a packet is transmitted on an advertising channel, the packet is an advertising packet. If a packet is transmitted on a data channel, the packet is a data packet.

It should be understood that the BLE advertising packet in this embodiment of the present invention may be an advertising packet sent by the second dual-mode Bluetooth device on an advertising channel, and a structure of the advertising packet may be shown in FIG. 3. A header of the packet includes a type of the advertising packet and some flag bits. In addition, there are multiple types of advertising packets, each type of advertising packet is corresponding to different packet data, and a meaning indicated by each packet type is as follows:

ADV_IND: universal advertising indication;
ADV_DIRECT_IND: directed connection indication;
ADV_NONCONN_IND: non-connectable indication;
NONCONN_IND: scannable indication;
SCAN_REQ: active scanning request;
SCAN_RSP: active scanning response; and
CONNECT$_{13}$ REQ: connection request.

When the packet is of the ADV_IND, ADV_DIRECT_IND, ADV_NONCONN_IND, or NONCONN_IND type, it means that a Bluetooth device within a transmission range of a sending device may receive an advertising packet. In the existing Bluetooth low energy specification, an advertising packet carries only data related to Bluetooth low energy. However, in this embodiment of the present invention, the attribute information of the classic Bluetooth is carried by using a reserved field in a data field in an existing advertising packet, an idle field and an extensible field in another field, and a user-defined field reserved in a vendor field, so that the BLE advertising packet can not only carry the data and information related to the Bluetooth low energy, but also carry data or information related to the classic Bluetooth. In this way, the Bluetooth device within the transmission range can obtain, by using the BLE advertising packet, the data or the information related to the classic Bluetooth of the Bluetooth device, and power consumption can be reduced by sending the BLE advertising packet.

During specific implementation, classic Bluetooth of a dual-mode Bluetooth device may establish connections to multiple Bluetooth devices. However, in consideration of security and privacy, or due to a resource limitation, some vendors set the classic Bluetooth of the dual-mode Bluetooth device to a state in which the classic Bluetooth can be connected to only one Bluetooth device. When the classic Bluetooth of the dual-mode Bluetooth device needs to establish a connection to another Bluetooth device, a classic Bluetooth connection established between the dual-mode Bluetooth device and a previous Bluetooth device needs to be first released, and the dual-mode Bluetooth device needs to restore to a factory setting, so as to establish the classic Bluetooth connection to the another Bluetooth device.

Optionally, when the attribute information includes a Bluetooth address of a peer device to which the classic Bluetooth of the second dual-mode Bluetooth device was connected last time, after receiving the BLE advertising packet, the first dual-mode Bluetooth device may obtain, from the attribute information in the BLE advertising packet, the Bluetooth address of the peer device to which the classic Bluetooth of the second dual-mode Bluetooth device was connected last time, and compare the Bluetooth address of the peer device with a Bluetooth address of the first dual-mode Bluetooth device, to determine the status of the classic Bluetooth of the second dual-mode Bluetooth device. When the Bluetooth address of the peer device is different from the Bluetooth address of the first dual-mode Bluetooth device, it indicates that the classic Bluetooth of the second dual-mode Bluetooth device was connected to a Bluetooth device last time other than the first dual-mode Bluetooth device. In this case, the first dual-mode Bluetooth device prompts the user to perform factory reset on the second dual-mode Bluetooth device. Specifically, when the classic Bluetooth of the second dual-mode Bluetooth device has been previously connected to another Bluetooth device, but is currently disconnected from the another Bluetooth device, the user may directly perform factory reset on the second dual-mode Bluetooth device. However, when the classic Bluetooth of the second dual-mode Bluetooth device is currently being connected to the another Bluetooth device, the first dual-mode Bluetooth device prompts the user to first release a classic Bluetooth connection between the second dual-mode Bluetooth device and the another Bluetooth device, and then perform factory reset on the second dual-mode Bluetooth device.

It should be understood that, the factory reset herein may indicate that the factory reset is performed on both classic Bluetooth and Bluetooth low energy of a dual-mode Bluetooth device, or may indicate that the factory reset is performed only on classic Bluetooth of a dual-mode Bluetooth device. Specifically, the factory reset may include: deleting sensitive information of a previous user, emptying setting information of the classic Bluetooth, or resetting setting information of the classic Bluetooth.

When the Bluetooth address of the peer device is the same as the Bluetooth device of the first dual-mode Bluetooth device, it indicates that the classic Bluetooth of the second dual-mode Bluetooth device was connected to the first dual-mode Bluetooth device last time, that is, the two Bluetooth devices have been connected, and the second dual-mode Bluetooth device can be found in a list of paired devices of the first dual-mode Bluetooth device. In this case, the first dual-mode Bluetooth device prompts the user to tap to select the second dual-mode Bluetooth device that is to be connected. Then, a classic Bluetooth device connection procedure and interface comes, and the user can establish the classic Bluetooth connection between the first dual-mode Bluetooth device and the second dual-mode Bluetooth device only by following a corresponding prompt.

Optionally, when the attribute information includes an enabling status of the classic Bluetooth of the second dual-mode Bluetooth device, the first dual-mode Bluetooth device may determine, according to the attribute information, whether the classic Bluetooth of the second dual-mode Bluetooth device is enabled or disabled. When the classic Bluetooth of the second dual-mode Bluetooth device is disabled, the first dual-mode Bluetooth device prompts the user to enable the classic Bluetooth of the second dual-mode Bluetooth device.

Optionally, when the attribute information includes the searchable status of the classic Bluetooth of the second dual-mode Bluetooth device, the first dual-mode Bluetooth device may determine, according to the attribute information, whether the classic Bluetooth of the second dual-mode Bluetooth device can be searched for. When the classic Bluetooth of the second dual-mode Bluetooth device cannot be searched for, the first dual-mode Bluetooth device prompts the user to set the classic Bluetooth of the second dual-mode Bluetooth device to a searchable state.

Specifically, when whether the classic Bluetooth of the second dual-mode Bluetooth device is in an inquiry scan state is used to indicate whether the classic Bluetooth of the second dual-mode Bluetooth device is in a searchable state, if the classic Bluetooth of the second dual-mode Bluetooth device cannot be searched for, the first dual-mode Bluetooth device prompts the user to enable a corresponding switch, so that the classic Bluetooth of the second dual-mode Bluetooth device is in an inquiry scan state.

Optionally, when the attribute information includes the connectable status of the classic Bluetooth of the second dual-mode Bluetooth device, the first dual-mode Bluetooth device may determine, according to the attribute information, whether the classic Bluetooth of the second dual-mode Bluetooth device can be connected. When the classic Bluetooth of the second dual-mode Bluetooth device cannot be connected, the first dual-mode Bluetooth device prompts the user to set the classic Bluetooth of the second dual-mode Bluetooth device to a connectable state.

Specifically, when whether the classic Bluetooth of the second dual-mode Bluetooth device is in a page scan state is used to indicate whether the classic Bluetooth of the second dual-mode Bluetooth device is in a connectable state, if the classic Bluetooth of the second dual-mode Bluetooth device cannot be connected, the first dual-mode Bluetooth device prompts the user to enable a corresponding switch, so that the classic Bluetooth of the second dual-mode Bluetooth device is in a page scan state.

It should be understood that, in this embodiment of the present invention, there may be two cases for the second dual-mode Bluetooth device. In a first case, the second dual-mode Bluetooth device is in a searchable state and a connectable state provided that the classic Bluetooth of the second dual-mode Bluetooth device is enabled. In a second case, not only the classic Bluetooth of the second dual-mode Bluetooth device needs to be enabled, but also another operation (for example, enabling the corresponding option switch) needs to performed on the second dual-mode Bluetooth device, so that the second dual-mode Bluetooth device can be in a searchable state and a connectable state.

Optionally, the attribute information may further carry application program information of the classic Bluetooth of the second dual-mode Bluetooth device. In this way, after receiving the BLE advertising packet, the second dual-mode Bluetooth device may obtain, according to the attribute information, an application program corresponding to the second dual-mode Bluetooth device, and then prompt the user to open the application program corresponding to the classic Bluetooth of the second dual-mode Bluetooth device. Specifically, when the application program corresponding to the second dual-mode Bluetooth device is not installed in the first dual-mode Bluetooth device, the first dual-mode Bluetooth device prompts the user to download and install the application program corresponding to the classic Bluetooth of the dual-mode Bluetooth device, and then prompts the user to open the application program. If the application program is installed in the first dual-mode Bluetooth device, the first dual-mode Bluetooth device may directly prompt the user to open the application program, so as to establish the classic Bluetooth connection between the first dual-mode Bluetooth device and the second dual-mode Bluetooth device.

Optionally, in addition to obtaining the application program information of the classic Bluetooth of the second dual-mode Bluetooth device from the attribute information, the first dual-mode Bluetooth device may prestore application program information corresponding to classic Bluetooth of different dual-mode Bluetooth devices, and after detecting the second dual-mode Bluetooth device, the first dual-mode Bluetooth device may automatically prompt the user to open the application program corresponding to the classic Bluetooth of the second dual-mode Bluetooth device, or prompt the user to install the application program corresponding to the dual-mode Bluetooth device.

It should be understood that, when the second dual-mode Bluetooth device needs to restore to the factory setting, but does not restore to the factory setting, if the classic Bluetooth of the second dual-mode Bluetooth device is not enabled, or if the classic Bluetooth of the second dual-mode Bluetooth device is not set to a searchable state and a connectable state, the first dual-mode Bluetooth device first prompts the user to perform factory reset on the second dual-mode Bluetooth device, and enable the classic Bluetooth of the second dual-mode Bluetooth device, or set the classic Bluetooth of the second dual-mode Bluetooth device to a searchable state and a connectable state; and then prompts the user to open, on an operation interface of the first dual-mode Bluetooth device, the application program corresponding to the classic Bluetooth of the second dual-mode Bluetooth device.

Optionally, the first dual-mode Bluetooth device may send another BLE advertising packet to another Bluetooth device. The BLE advertising packet may include attribute information of classic Bluetooth of the first dual-mode Bluetooth device. The attribute information may include a Bluetooth address of a peer device to which the classic Bluetooth of the first dual-mode Bluetooth device was connected last time, an enabling status of the classic Bluetooth of the first dual-mode Bluetooth device, a searchable status of the classic Bluetooth of the first dual-mode Bluetooth device, a connectable status of the classic Bluetooth of the first dual-mode Bluetooth device, and the like.

With reference to FIG. 4A and FIG. 4B to FIG. 6, the following uses a connection between a mobile phone and a wristband (or a smartwatch) as an example to describe in detail a method for establishing a classic Bluetooth connection between dual-mode Bluetooth Bluetooth devices in an embodiment of the present invention.

Figure 4A:
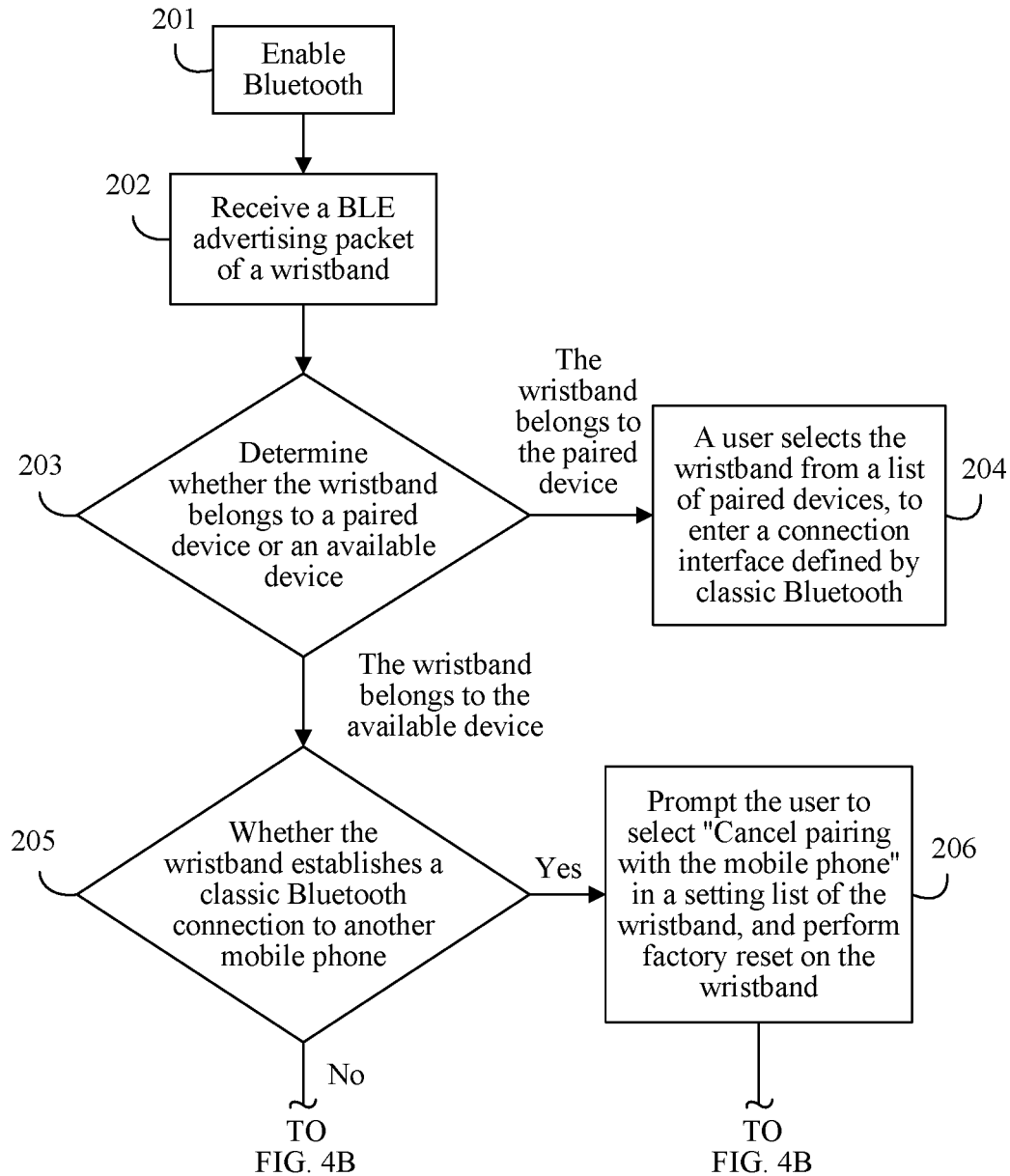
FIG. 4A and FIG. 4B are a schematic flowchart of a method for establishing a classic Bluetooth connection between dual-mode Bluetooth Bluetooth devices according to an embodiment of the present invention.
Figure 4B:
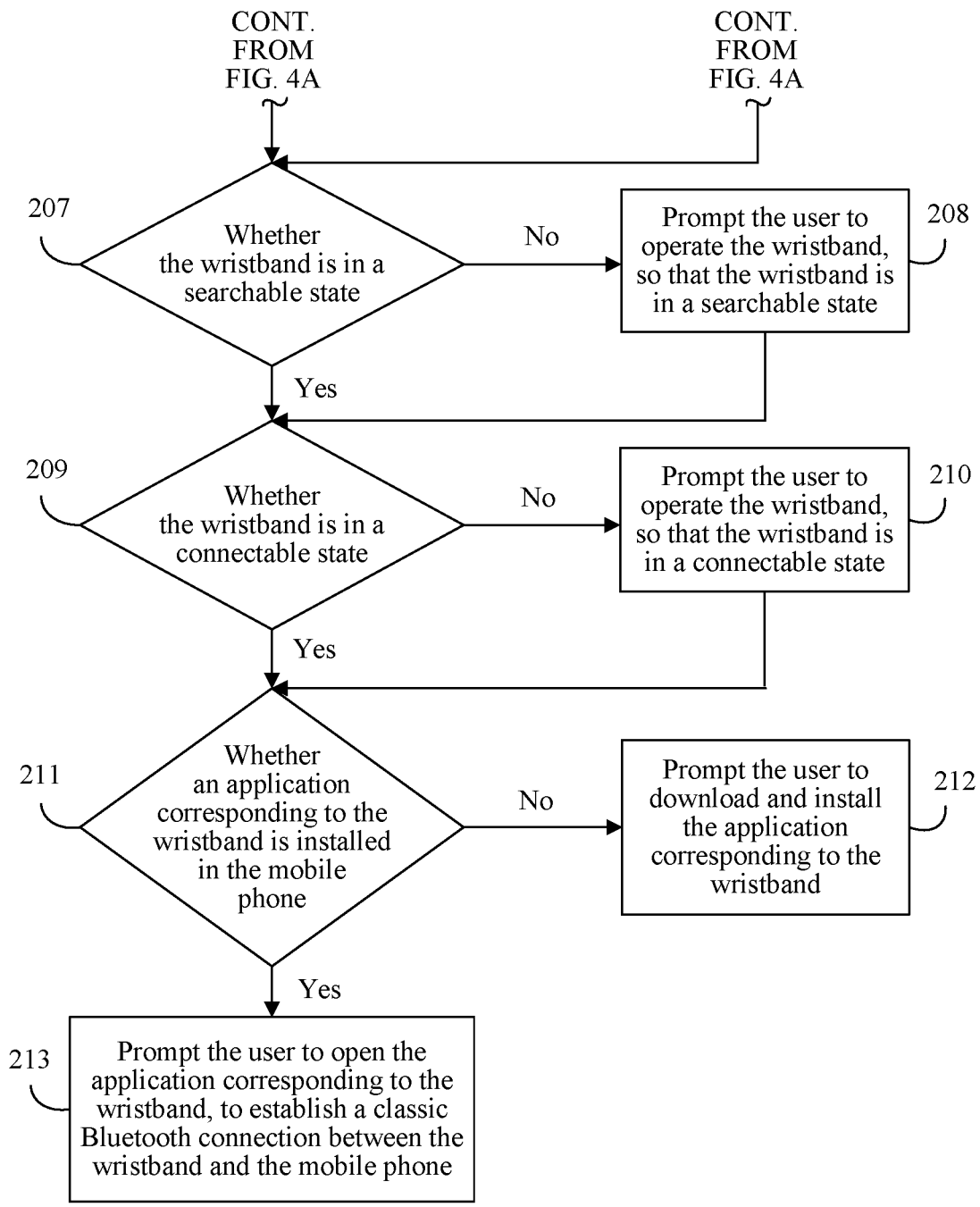

FIG. 4A and FIG. 4B are a schematic flowchart of a method for establishing a classic Bluetooth connection between dual-mode Bluetooth Bluetooth devices according to an embodiment of the present invention. A connection between a mobile phone and a wristband (both the wristband and the mobile phone herein are dual-mode Bluetooth devices) is used as an example in the method in FIG. 4A and FIG. 4B. The method for connecting dual-mode Bluetooth devices in this embodiment of the present invention is described in detail from a perspective of the mobile phone. Specific steps are as follows:

201. Enable Bluetooth. Select the Bluetooth in a setting option in the mobile phone, and switch the Bluetooth from a disabled state to an enabled state, or select a Bluetooth icon from a drop-down shortcut menu of the mobile phone to enable a Bluetooth function.

202. The mobile phone receives a BLE advertising packet sent by the wristband around the mobile phone. It should be understood that, the wristband herein may transmit the BLE advertising packet to a surrounding Bluetooth device only when the wristband is not connected to classic Bluetooth of another Bluetooth device, or the wristband may send the BLE advertising packet to a surrounding Bluetooth device regardless of whether the wristband is connected to classic Bluetooth of another Bluetooth device. Preferably, regardless of a status of the wristband, the wristband may send the BLE advertising packet to the surrounding device. In this case, regardless of whether the wristband is connected to the classic Bluetooth of the another Bluetooth device, the surrounding Bluetooth device can receive the BLE advertising packet of the wristband.

203. Determine whether the wristband belongs to a paired device or an available device. That is, the mobile phone may determine, according to attribute information that is of classic Bluetooth and that is carried in the BLE advertising packet, whether the wristband belongs to a device that has been paired with the mobile phone. If the wristband belongs to the device that has been paired with the mobile phone, the wristband is displayed in a list of paired devices; or if the wristband does not belong to the device that has been paired with the mobile phone, the wristband is displayed in a list of available devices.

204. If the wristband is in a list of paired devices of the mobile phone, it indicates that the wristband belongs to the paired device, and in this case, a user may select the wristband from the list of paired devices, to enter a connection interface defined by classic Bluetooth.

205. If the wristband is in a list of available devices of the mobile phone, it indicates that the wristband belongs to the available device, and in this case, the mobile phone determines, according to the received BLE advertising packet, whether the wristband establishes a Bluetooth connection to another mobile phone. Optionally, pairing is relatively independent of connection. The wristband may be paired with multiple different mobile phones or other terminals. Therefore, when the mobile phone belongs to the paired device, the mobile phone may further determine whether the wristband establishes the Bluetooth connection to the another mobile phone. This is not specifically limited in this embodiment of the present invention.

206. Prompt the user to select "Cancel pairing with the mobile phone" in a setting list of the wristband, and perform factory reset on the wristband.

207. Determine whether the wristband is in a searchable state.

208. If the wristband is in a non-searchable state, the mobile phone prompts the user to operate the wristband, so that the wristband is in a searchable state.

209. If the wristband is in a searchable state, continue to determine whether the wristband is in a connectable state.

210. If the wristband is in a non-connectable state, the mobile phone prompts the user to operate the wristband, so that the wristband is in a connectable state.

211. Determine whether an application corresponding to the wristband is installed in the mobile phone. The mobile phone may determine, according to application program information that is of the wristband and that is obtained from the BLE advertising packet, the application corresponding to the wristband, or the mobile phone may further determine, according to a prestored application program corresponding to the wristband, the application corresponding to the wristband.

212. When the application corresponding to the wristband is not installed in the mobile phone, the mobile phone prompts the user to download and install the application corresponding to the wristband.

213. If the application corresponding to the wristband is installed in the mobile phone, the mobile phone may prompt the user to directly open the application corresponding to the wristband, to implement a connection between the wristband and the mobile phone.

It should be understood that, the procedure shown in FIG. 4A and FIG. 4B is only a specific case of the method for connecting dual-mode Bluetooth devices in this embodiment of the present invention, and does not limit a specific implementation procedure of the method for connecting dual-mode Bluetooth devices in this embodiment of the present invention.

With reference to mobile phone operation interfaces shown in FIG. 5 and FIG. 6, a method for connecting dual-mode Bluetooth devices in an embodiment of the present invention is described below.

Figure 5:
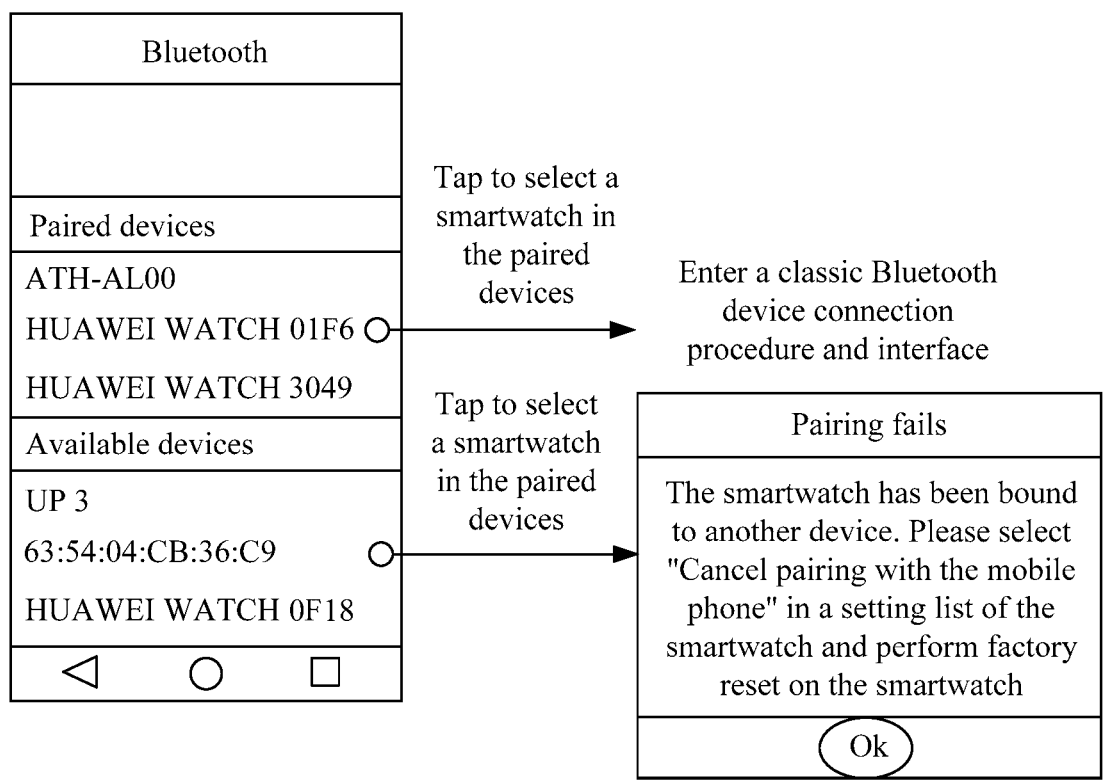
FIG. 5 is a schematic flowchart of a method for establishing a classic Bluetooth connection between dual-mode Bluetooth Bluetooth devices according to an embodiment of the present invention.

In FIG. 5, paired devices and available devices displayed in a list in a mobile phone can be connected to the mobile phone in different manners. The paired devices are Bluetooth devices that have established classic Bluetooth connections to the mobile phone. For example, when a smartwatch (HUAWEI WATCH 01F6) in the paired devices is selected by means of tapping, a classic Bluetooth connection procedure and interface is displayed. Then, a classic Bluetooth connection between the smartwatch and the mobile phone may be completed by performing a corresponding connection procedure. The available devices are surrounding Bluetooth devices found by the mobile phone, and these Bluetooth devices have not established classic Bluetooth connections to the mobile phone. In comparison with the paired devices, a process of establishing classic Bluetooth connections to these unpaired Bluetooth devices by the mobile phone is more complex.

It should be understood that, if the smartwatch is bound to another mobile phone device, to ensure user privacy and improve data security, a vendor may set the smartwatch to a state in which the smartwatch can be connected to only one mobile phone at a time. If a classic Bluetooth connection needs to be established between the smartwatch and another mobile phone, pairing of the smartwatch and the mobile phone needs to be first cancelled, and then factory reset is performed on the smartwatch. In this way, the smartwatch can be connected to the another mobile phone.

Specifically, it is assumed that the mobile phone finds a surrounding smartwatch (63:54:04:CB:36:C9) by using a BLE advertising packet, but classic Bluetooth of the smartwatch has been bound to another mobile phone device, that is, the smartwatch has established a classic Bluetooth connection to the another mobile phone. In this case, if a user taps to select the smart watch, an intelligent terminal displays a dialog box shown in the diagram, to notify the user that the classic Bluetooth of the smartwatch has been bound to the another mobile phone device. If the user still needs to connect the smartwatch to the mobile phone, the user needs to select "Cancel pairing with the mobile phone" in a setting list of the smartwatch, and then perform factory reset on the smartwatch.

Certainly, it is assumed that the vendor sets the smartwatch to a state in which the smartwatch can establish classic Bluetooth connections to multiple mobile phones. When the smartwatch has established a classic Bluetooth connection to a mobile phone, but also needs to establish a classic Bluetooth connection to another mobile phone, the user directly establishes the classic Bluetooth connection between the smartwatch and the another mobile phone, instead of cancelling pairing of the smartwatch and the mobile phone and performing factory reset on the smartwatch.

Figure 6:
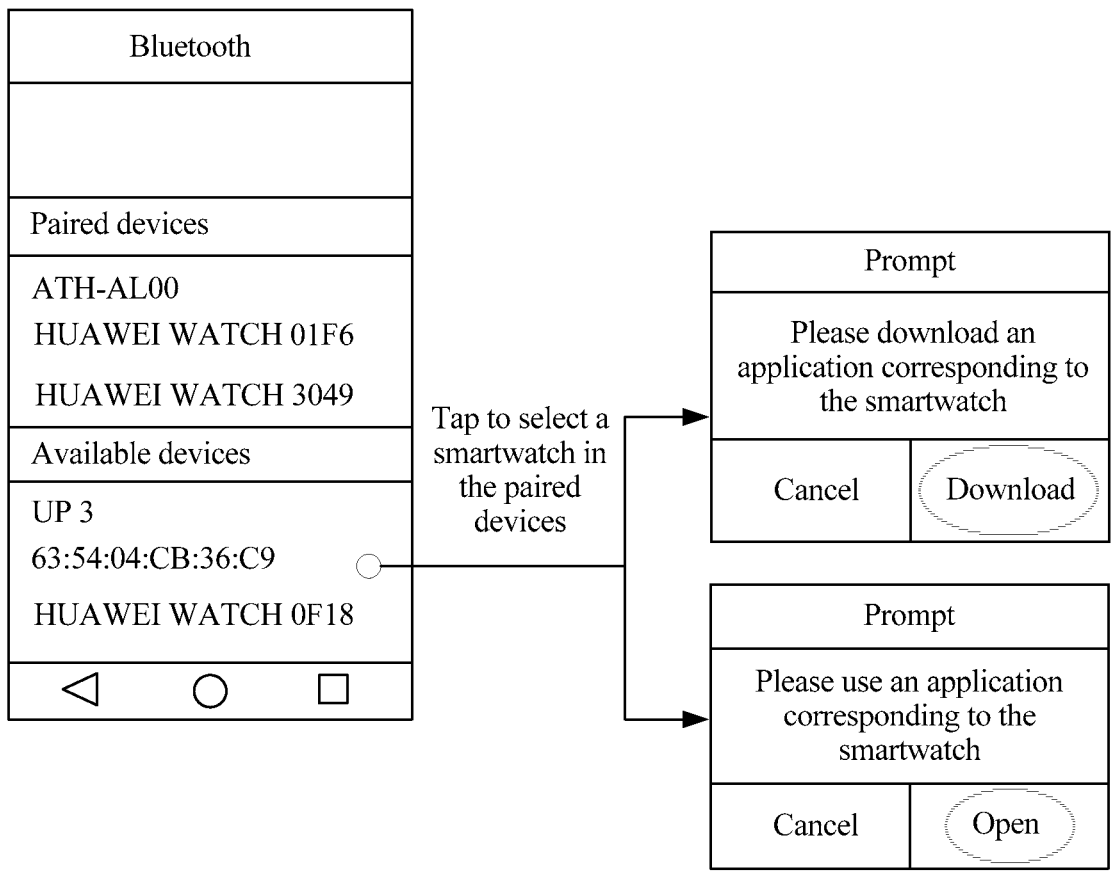
FIG. 6 is a schematic flowchart of a method for establishing a classic Bluetooth connection between dual-mode Bluetooth Bluetooth devices according to an embodiment of the present invention.

In FIG. 6, it is assumed that a mobile phone finds a surrounding smartwatch (63:54:04:CB:36:C9) by using a BLE advertising packet, and the smartwatch is not bound to another mobile phone, and is in a searchable and connectable state. In this case, if a user taps to select the smartwatch in an available device list in the mobile phone, the mobile phone prompts the user to open an application corresponding to the watch. If the application corresponding to the smartwatch is not installed in the mobile phone, the mobile phone prompts the user to download the application corresponding to the smartwatch, and then prompts the user to open the application corresponding to the smartwatch, so as to connect the mobile phone to the smartwatch.

A method for connecting dual-mode Bluetooth devices in an embodiment of the present invention is described above in detail with reference to FIG. 1 to FIG. 6, and a dual-mode Bluetooth device in an embodiment of the present invention is described below with reference to FIG. 7 to FIG. 9.

Figure 7:
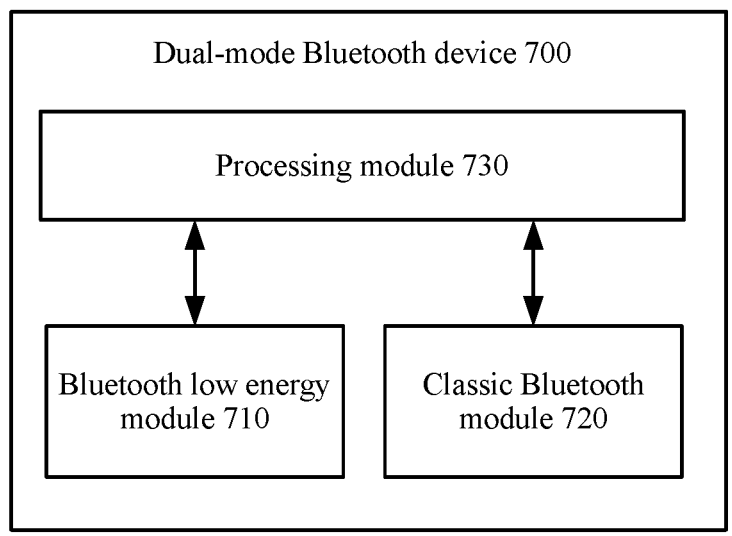
FIG. 7 is a schematic block diagram of a dual-mode Bluetooth device according to an embodiment of the present invention.
Figure 8:
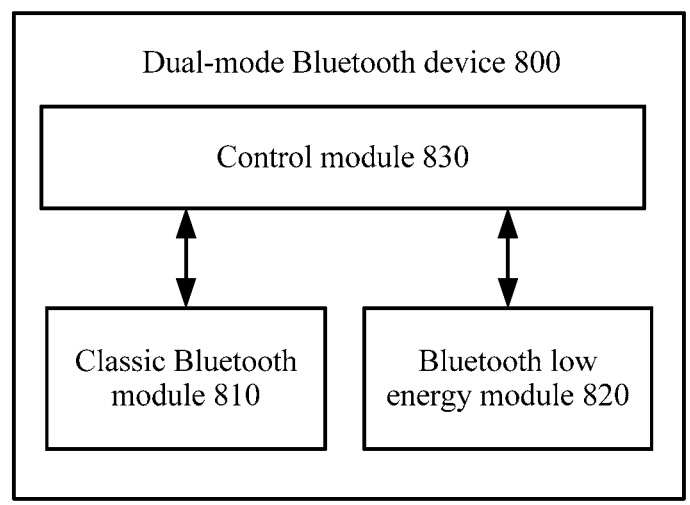
FIG. 8 is a schematic block diagram of a dual-mode Bluetooth device according to an embodiment of the present invention.
Figure 9:
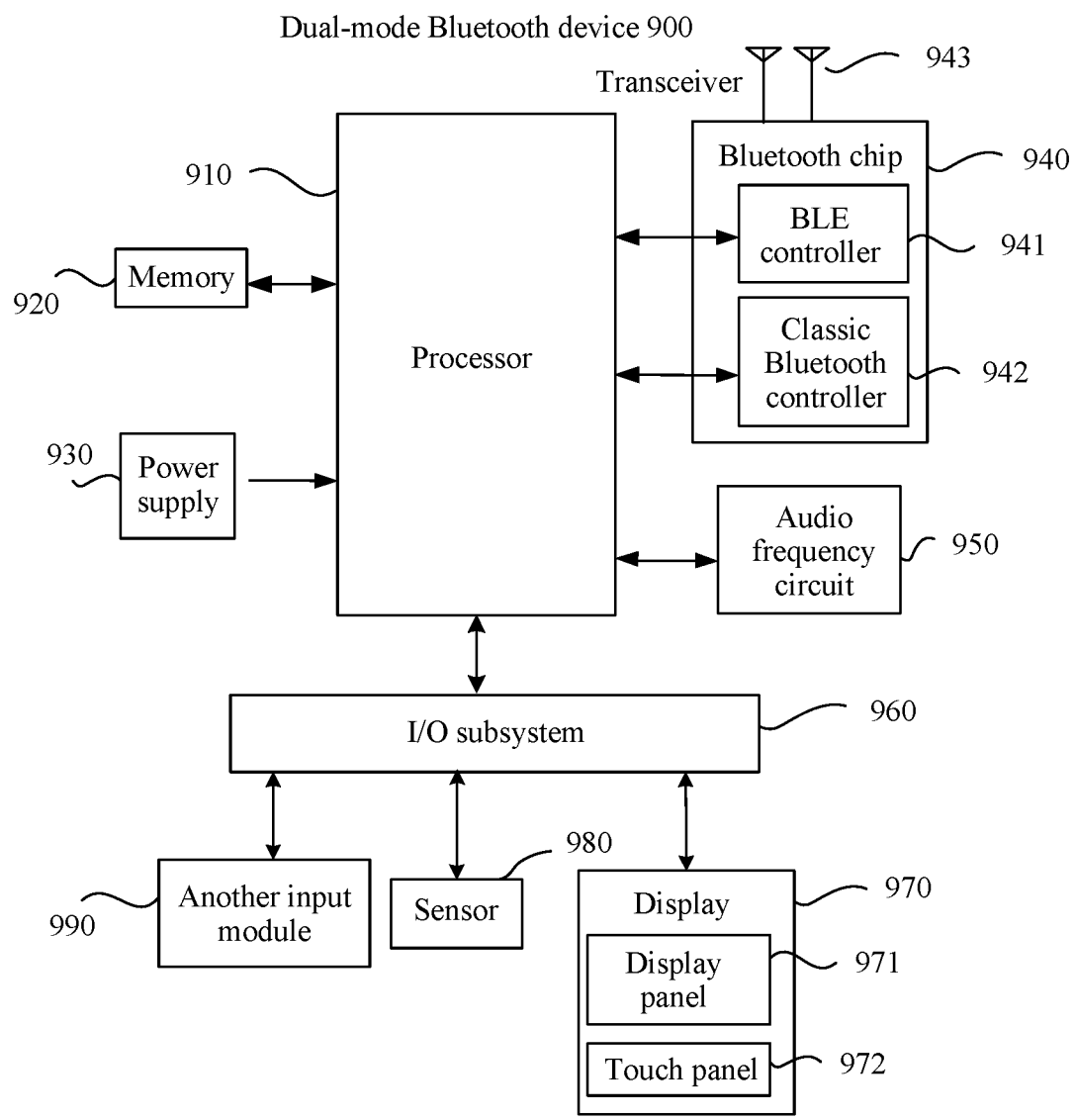
FIG. 9 is a schematic block diagram of a dual-mode Bluetooth device according to an embodiment of the present invention.

It should be understood that the dual-mode Bluetooth device described in FIG. 7 to FIG. 9 in the embodiment of the present invention can implement all steps of the method for connecting dual-mode Bluetooth devices that is described in FIG. 1 to FIG. 6 in the embodiment of the present invention. For brevity, repeated description is appropriately omitted.

FIG. 7 is a schematic block diagram of a dual-mode Bluetooth device according to an embodiment of the present invention. The dual-mode Bluetooth device 700 may be corresponding to the first dual-mode Bluetooth device in the method for connecting dual-mode Bluetooth devices in the embodiment of the present invention. The dual-mode Bluetooth device 700 includes a Bluetooth low energy module 710, a classic Bluetooth module 820, and a processing module 730.

The Bluetooth low energy module 710 is configured to receive a BLE advertising packet sent by another dual-mode Bluetooth device, and the BLE advertising packet includes attribute information of classic Bluetooth of the another dual-mode Bluetooth device. Then, the processing module 730 may obtain the BLE advertising packet received by the Bluetooth low energy module 710, and determine a status of the classic Bluetooth of the another dual-mode Bluetooth device according to the attribute information in the advertising packet. Finally, the dual-mode Bluetooth device may prompt, according to the status of the classic Bluetooth of the another dual-mode Bluetooth device, a user to operate the dual-mode Bluetooth device or the another dual-mode Bluetooth device, so as to establish a classic Bluetooth connection between the dual-mode Bluetooth device and the another dual-mode Bluetooth device.

In this embodiment of the present invention, the dual-mode Bluetooth device may determine the status of the classic Bluetooth of the another dual-mode Bluetooth device according to the attribute information that is of the classic Bluetooth and that is obtained from the BLE advertising packet, and instruct, according to the status of the classic Bluetooth, the user to perform a corresponding operation to establish the classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

Optionally, when the processing module 730 obtains, from the attribute information of the classic Bluetooth of the another dual-mode Bluetooth device, a Bluetooth address of a peer device to which the classic Bluetooth of the another dual-mode Bluetooth device was connected last time, the processing module may compare the Bluetooth address of the peer device with a Bluetooth address of the dual-mode Bluetooth device, and determine a status of classic Bluetooth of a second dual-mode Bluetooth device. When the Bluetooth address of the peer device is different from the Bluetooth address of the dual-mode Bluetooth device, the dual-mode Bluetooth device prompts the user to perform factory reset on the another dual-mode Bluetooth device.

Optionally, the processing module 730 may obtain an enabling status of the classic Bluetooth of the another dual-mode Bluetooth device from the attribute information. When the classic Bluetooth of the another dual-mode Bluetooth device is disabled, the processing module 730 prompts the user to enable the classic Bluetooth of the another dual-mode Bluetooth device.

Optionally, the processing module 730 may obtain a searchable status of the classic Bluetooth of the another dual-mode Bluetooth device from the attribute information. When the classic Bluetooth of the another dual-mode Bluetooth device cannot be searched for, the processing module 730 prompts the user to set the classic Bluetooth of the another dual-mode Bluetooth device to a searchable state.

Optionally, the processing module 730 may obtain a connectable status of the classic Bluetooth of the another dual-mode Bluetooth device from the attribute information. When the classic Bluetooth of the another dual-mode Bluetooth device cannot be connected, the processing module 730 prompts the user to set the classic Bluetooth of the another dual-mode Bluetooth device to a connectable state.

FIG. 8 is a schematic block diagram of a dual-mode Bluetooth device according to an embodiment of the present invention. The dual-mode Bluetooth device 800 may be corresponding to the second dual-mode Bluetooth device in the method for connecting dual-mode Bluetooth devices in the embodiment of the present invention. The dual-mode Bluetooth device 800 includes a classic Bluetooth module 810, a Bluetooth low energy module 820, and a control module 830.

The control module 830 is configured to control the Bluetooth low energy module 820 to generate a BLE advertising packet, and the BLE advertising packet includes attribute information of classic Bluetooth of the classic Bluetooth module 810 of the dual-mode Bluetooth device. Then, the control module 830 controls the Bluetooth low energy module 820 to send the BLE advertising packet. In this way, after receiving the BLE advertising packet, another surrounding Bluetooth device may determine a status of the classic Bluetooth of the dual-mode Bluetooth device according to the attribute information in the BLE advertising packet. Then, a classic Bluetooth connection may be established between the dual-mode Bluetooth device and the another Bluetooth device according to the status of the classic Bluetooth of the dual-mode Bluetooth device.

In this embodiment of the present invention, the dual-mode Bluetooth device generates the BLE advertising packet including the attribute information of the classic Bluetooth of the dual-mode Bluetooth device, and sends the BLE advertising packet to the surrounding Bluetooth device by using Bluetooth low energy. In this way, the surrounding Bluetooth device may determine the status of the classic Bluetooth of the dual-mode Bluetooth device according to the attribute information of the classic Bluetooth of the dual-mode Bluetooth device, and then instruct a user to perform a corresponding operation to establish the classic Bluetooth connection between the dual-mode Bluetooth devices. That is, for the classic Bluetooth in different states, the user can establish the classic Bluetooth connection only by performing a corresponding operation according to a prompt of the dual-mode Bluetooth device, so that a procedure of establishing a classic Bluetooth connection is simplified, and user experience is improved.

The attribute information carried in the BLE advertising packet may include the following several types of information:

a Bluetooth address of a peer device to which the classic Bluetooth of the dual-mode Bluetooth device was connected last time;

an enabling status of the classic Bluetooth of the dual-mode Bluetooth device;

a searchable status of the classic Bluetooth of the dual-mode Bluetooth device;

a connectable status of the classic Bluetooth of the dual-mode Bluetooth device; and application program information of the classic Bluetooth of the dual-mode Bluetooth device.

FIG. 9 is a schematic block diagram of a dual-mode Bluetooth device according to an embodiment of the present invention. The dual-mode Bluetooth device may be the first dual-mode Bluetooth device or the second dual-mode Bluetooth device in the method for connecting dual-mode Bluetooth devices in the embodiment of the present invention.

As shown in FIG. 9, the dual-mode Bluetooth device 900 may include components such as a processor 910, a memory 920, a power supply 930, a Bluetooth chip 940, an audio frequency circuit 950, an I/O subsystem 960, a display 970, a sensor 980, and another input device 990. A person skilled in the art may understand that a structure shown in FIG. 9 does not constitute a limitation on a structure of the dual-mode Bluetooth device in this embodiment of the present invention. The dual-mode Bluetooth device in this embodiment of the present invention may include more or less components than those shown in the diagram, or combine some components, or split some components, or have different component arrangements.

Each constituent component of the dual-mode Bluetooth device 900 is described below in detail with reference to FIG. 9.

The processor 910 is a control center of the terminal 900, and is connected to each part of the entire mobile terminal by using various interfaces and lines. By running or executing a software program and/or a module stored in the memory 920 and invoking data stored in the memory 920, the processor 910 executes various functions of the dual-mode Bluetooth device 900 and processes data, so as to perform overall monitoring on the mobile terminal. Optionally, the processor 910 may include one or more processors or processing modules. Preferably, an application processor (Application Processor, AP) and a modem processor may be integrated into the processor 910. The AP mainly processes an operating system, a user interface, an application program, and the like, and the modem processor mainly processes wireless communication. In this embodiment of the present invention, the processor 910 may further include a graphics processing unit GPU, and this is not specifically limited in the present invention. To implement the solution in the present invention, the processor 910 is further integrated with a Bluetooth module to implement related functions such as a Bluetooth connection and data transmission.

The memory 920 may be configured to store the software program and the module, and the processor 910 executes various function applications of the dual-mode Bluetooth device 900 and processes data by running the software program and the module stored in the memory 920. The memory 920 may mainly include a program storage area and a data storage area. The program storage area may store an operating system, an application program required by at least one function (for example, Bluetooth control or a Bluetooth connection function), and the like. The data storage area may store data (for example, a ciphertext generation algorithm or a Bluetooth connection record) created according to use of the dual-mode Bluetooth device 900, and the like. In addition, the memory 920 may include a high-speed random access memory, and may further include a nonvolatile memory, for example, at least one magnetic disk memory component, a flash memory component, or another volatile solid-state memory component.

The power supply 930, such as a battery, may supply power to each component. Preferably, the power supply may be logically connected to the processor 910 by using a power supply management system, so as to implement functions such as charging management, discharging management, and power consumption management by using the power supply management system.

The dual-mode Bluetooth device 900 may further include the Bluetooth chip 940. In this embodiment of the present invention, the Bluetooth chip 940 may include a BLE controller 941, a classic Bluetooth controller 942, and a transceiver 943. The BLE controller 941 and the classic Bluetooth controller 942 may send and receive a Bluetooth radio frequency signal by controlling the transceiver 943.

For example, the BLE controller 941 may control the transceiver 943 to send and receive a BLE advertising packet, and the classic Bluetooth controller 942 may control the transceiver 943 to send and receive a classic Bluetooth connection request, a classic Bluetooth connection response, and the like. The dual-mode Bluetooth device 900 may control the BLE controller 941 and the classic Bluetooth controller 942 in the Bluetooth chip 940 by using the Bluetooth module in the processor 910.

The Bluetooth chip 940 may prestore some data, for example, a prestored signal strength threshold of a Bluetooth signal, an address of a target Bluetooth terminal that can be connected, a ciphertext, or another identity. The Bluetooth chip 940 may independently perform some simple processing, for example, detecting signal strength of a Bluetooth-related message and/or comparing the detected signal strength with the prestored signal strength threshold; or parsing a Bluetooth-related message such as an advertising packet, and matching an address, a ciphertext, or another identity in the Bluetooth-related message with corresponding prestored information.

It can be understood that the BLE controller 941 and the classic Bluetooth controller 942 may be independent hardware modules, or may be logically independent modules whose hardware is integrated together. It can be further understood that the Bluetooth chip 940 may belong to a category of the processor 910. In addition, the dual-mode Bluetooth device 900 may have no independent Bluetooth chip. A circuit and a function related to the Bluetooth chip 940 may be integrated into the processor 910. For example, the circuit and the function may be integrated into an AP of a mobile phone or an AP of a watch. In this case, the Bluetooth module integrates all the described function modules related to Bluetooth function implementation.

The audio frequency circuit 250 may include a microphone and a loudspeaker, and provide an audio interface between a user and the dual-mode Bluetooth device 900. The audio frequency circuit 950 may output audio data to the Bluetooth module or the Bluetooth chip 940, to send the audio data to another terminal, or output audio data obtained from the Bluetooth module or the Bluetooth chip 940 to the user, or the like.

The I/O subsystem 960 is configured to control an input/output external device, and may include another device input controller, a sensor controller, and a display controller.

The terminal may include the display 970. The display 970 may be configured to display information entered by the user or information provided for the user, and various menus of the dual-mode Bluetooth device 900, and may further receive user input. Specifically, the display 970 may include a display panel 971 and a touch panel 972. The display controller in the I/O subsystem 960 may receive a signal from the display 970 and/or send a signal to the display 970, to implement man-machine interaction.

The dual-mode Bluetooth device 900 may further include one or more sensors 980, such as an optical sensor, a motion sensor, and another sensor. The sensor controller in the I/O subsystem 960 may receive a signal from the one or more sensors 980 and/or may send a signal to the one or more sensors 980.

The another input module 990 may be configured to: receive entered numeral or character information, and generate key signal input related to a user setting and function control of the dual-mode Bluetooth device 900. One or more other device input controllers receive a signal from the another input device 990 and/or send a signal to the another input device 990.

Although not shown in FIG. 9, the dual-mode Bluetooth device 900 may further include a radio frequency circuit, configured to receive and send information, or receive and send a signal during a call. The dual-mode Bluetooth device 900 may further include a camera lens, a Wireless Fidelity (Wireless-Fidelity, Wi-Fi or WiFi) module, an infrared module, and the like. Details are not described herein.

It should be understood that the dual-mode Bluetooth device for implementing this embodiment of the present invention may be a processor or a processor with a necessary auxiliary circuit and a necessary auxiliary component, or a chip or a chip group including multiple chips, or the like.

The dual-mode Bluetooth device 900 shown in FIG. 9 may receive, by using the transceiver 943, a BLE advertising packet sent by another dual-mode Bluetooth device. After the BLE advertising packet is received, the processor 910 may obtain the BLE advertising packet from the memory 920 or directly obtain the BLE advertising packet from a storage unit of the processor 910, and then determine a status of classic Bluetooth of the another dual-mode Bluetooth device according to attribute information in the BLE advertising packet. Then, the processor 910 may prompt, by using the display 970 according to the status of the classic Bluetooth of the another Bluetooth device, a user to operate the dual-mode Bluetooth device 910 or the another dual-mode Bluetooth device, so as to establish a classic Bluetooth connection between the dual-mode Bluetooth device 900 and the another dual-mode Bluetooth device.

In addition, the dual-mode Bluetooth device 900 may further generate, by using the BLE controller, a BLE advertising packet including attribute information of classic Bluetooth of the dual-mode Bluetooth device 900, and then send the BLE advertising packet to another surrounding Bluetooth device by using the transceiver 943. In this way, after receiving the BLE advertising packet, the another Bluetooth device may obtain a status of the classic Bluetooth of the dual-mode Bluetooth device 900. Then, a classic Bluetooth connection may be established between the dual-mode Bluetooth device 900 and the another Bluetooth device according to the status of the classic Bluetooth of the dual-mode Bluetooth device 900.

It should be understood that, FIG. 7 to FIG. 9 all show the dual-mode Bluetooth device in the embodiments of the present invention. The processing module 730 in FIG. 7 is equivalent to the processor 910 in FIG. 9, and the Bluetooth low energy module 710 and the classic Bluetooth module 720 are corresponding to the Bluetooth chip 940 in FIG. 9. The classic Bluetooth module 810 and the Bluetooth low energy module 820 in FIG. 8 are corresponding to the Bluetooth chip 940 in FIG. 9, and the control module 830 is corresponding to the BLE controller and the classic Bluetooth controller in the Bluetooth chip 940 in FIG. 9. It should be understood that, the dual-mode Bluetooth device in the embodiments of the present invention may be a device including all the modules shown in FIG. 9, or may be a device including only some modules shown in FIG. 9, or may be a device including another module or structure in addition to the modules shown in FIG. 9.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for establishing a classic Bluetooth connection between dual-mode Bluetooth devices, comprising:
    receiving, by a first dual-mode Bluetooth device, a Bluetooth low energy (BLE) advertising packet sent by a second dual-mode Bluetooth device, wherein the BLE advertising packet comprises attribute information of classic Bluetooth of the second dual-mode Bluetooth device and wherein the attribute information comprises at least a Bluetooth address of a peer device to which the classic Bluetooth of the second dual-mode Bluetooth device was previously connected;
    determining, by the first dual-mode Bluetooth device, a first status of the classic Bluetooth of the second dual-mode Bluetooth device according to the attribute information, including determining, by the first dual-mode Bluetooth device according to a relationship between a Bluetooth address of the first dual-mode Bluetooth device and the Bluetooth address of the peer device, whether the classic Bluetooth of the second dual-mode Bluetooth device can establish the classic Bluetooth connection to the first dual-mode Bluetooth device currently; and
    prompting, by the first dual-mode Bluetooth device according to the first status of the classic Bluetooth of the second dual-mode Bluetooth device, a user to operate the first dual-mode Bluetooth device or the second dual-mode Bluetooth device to establish a classic Bluetooth connection between the first dual-mode Bluetooth device and the second dual-mode Bluetooth device, including:
    prompting, by the first dual-mode Bluetooth device, the user to perform a factory reset on the second dual-mode Bluetooth device in response to the classic Bluetooth of the second dual-mode Bluetooth device being unable to establish the classic Bluetooth connection to the first dual-mode Bluetooth device currently.

2. The method according to claim 1, wherein the attribute information further comprises an enabling status of the classic Bluetooth of the second dual-mode Bluetooth device, and wherein the method further comprises:
    determining, by the first dual-mode Bluetooth device, a second status of the classic Bluetooth of the second dual-mode Bluetooth device according to the attribute information; and
    prompting, by the first dual-mode Bluetooth device according to the second status of the classic Bluetooth of the second dual-mode Bluetooth device, the user to operate the first dual-mode Bluetooth device or the second dual-mode Bluetooth device, including:
        in response to the classic Bluetooth of the second dual-mode Bluetooth device being disabled, prompting, by the first dual-mode Bluetooth device, the user to enable the classic Bluetooth of the second dual-mode Bluetooth device.

3. The method according to claim 1, wherein the attribute information further comprises a searchable status of the classic Bluetooth of the second dual-mode Bluetooth device, and wherein the method further comprises:
    determining, by the first dual-mode Bluetooth device, a second status of the classic Bluetooth of the second dual-mode Bluetooth device according to the attribute information; and
    prompting, by the first dual-mode Bluetooth device according to the second status of the classic Bluetooth of the second dual-mode Bluetooth device, the user to operate the first dual-mode Bluetooth device or the second dual-mode Bluetooth device, including:
        in response to the classic Bluetooth of the second dual-mode Bluetooth device being unable to be searched, prompting, by the first dual-mode Bluetooth device, the user to set the classic Bluetooth of the second dual-mode Bluetooth device to a searchable state.

4. The method according to claim 1, wherein the attribute information further comprises a connectable status of the classic Bluetooth of the second dual-mode Bluetooth device, and wherein the method further comprises:
- determining, by the first dual-mode Bluetooth device, a second status of the classic Bluetooth of the second dual-mode Bluetooth device according to the attribute information; and
- prompting, by the first dual-mode Bluetooth device according to the second status of the classic Bluetooth of the second dual-mode Bluetooth device, the user to operate the first dual-mode Bluetooth device or the second dual-mode Bluetooth device comprises:
  - in response to the classic Bluetooth of the second dual-mode Bluetooth device being unable to be connected, prompting, by the first dual-mode Bluetooth device, the user to set the classic Bluetooth of the second dual-mode Bluetooth device to a connectable state.

5. The method according to claim 1, wherein the attribute information further comprises application program information of the classic Bluetooth of the second dual-mode Bluetooth device, and wherein the method further comprises:
- determining, by the first dual-mode Bluetooth device according to the application program information, an application program corresponding to the classic Bluetooth of the second dual-mode Bluetooth device, wherein the application program is used to establish the classic Bluetooth connection between the first dual-mode Bluetooth device and the second dual-mode Bluetooth device; and
- prompting, by the first dual-mode Bluetooth device on an operation interface of the first dual-mode Bluetooth device, the user to open the application program corresponding to the second dual-mode Bluetooth device.

6. The method according to claim 5, wherein the application program corresponding to the classic Bluetooth of the second dual-mode Bluetooth device is not installed in the first dual-mode Bluetooth device, and before prompting, by the first dual-mode Bluetooth device on an operation interface of the first dual-mode Bluetooth device, the user to open the application program corresponding to the classic Bluetooth of the second dual-mode Bluetooth device, the method further comprises:
- prompting, by the first dual-mode Bluetooth device, the user to download and install the application program corresponding to the classic Bluetooth of the second dual-mode Bluetooth device.

7. The method according to claim 1, wherein the method further comprises:
- sending, by the first dual-mode Bluetooth device, another BLE advertising packet to another Bluetooth device, wherein the another BLE advertising packet comprises attribute information of classic Bluetooth of the first dual-mode Bluetooth device.

8. A dual-mode Bluetooth device, comprising:
- a transceiver, the transceiver configured to receive a Bluetooth low energy (BLE) advertising packet sent by second dual-mode Bluetooth device, wherein the BLE advertising packet comprises attribute information of classic Bluetooth of the second dual-mode Bluetooth device and wherein the attribute information comprises at least a Bluetooth address of a peer device to which the classic Bluetooth of the second dual-mode Bluetooth device was previously connected; and
- at least one processor, the at least one processor configured to:
  - determine a first status of the classic Bluetooth of the second dual-mode Bluetooth device according to the attribute information, comprises determining, according to a relationship between a Bluetooth address of the first dual-mode Bluetooth device and the Bluetooth address of the peer device, whether the classic Bluetooth of the second dual-mode Bluetooth device can establish the classic Bluetooth connection to the first dual-mode Bluetooth device currently; and
  - prompt, according to the first status of the classic Bluetooth of the second dual-mode Bluetooth device, a user to operate the dual-mode Bluetooth device or the second dual-mode Bluetooth device to establish a classic Bluetooth connection between the dual-mode Bluetooth device and the second dual-mode Bluetooth device, comprises:
    - prompting the user to perform a factory reset on the second dual-mode Bluetooth device in response to the classic Bluetooth of the second dual-mode Bluetooth device being unable to establish the classic Bluetooth connection to the first dual-mode Bluetooth device currently.

9. The dual-mode Bluetooth device according to claim 8, wherein the attribute information further comprises an enabling status of the classic Bluetooth of the second dual-mode Bluetooth device, and the at least one processor is configured to:
- determine a second status of the classic Bluetooth of the second dual-mode Bluetooth device according to the attribute information;
- prompt, according to the second status of the classic Bluetooth of the second dual-mode Bluetooth device, a user to operate the dual-mode Bluetooth device or the second dual-mode Bluetooth device to establish a classic Bluetooth connection between the dual-mode Bluetooth device and the second dual-mode Bluetooth device, comprises:
  - in response to the classic Bluetooth of the second dual-mode Bluetooth device being disabled, prompt the user to enable the classic Bluetooth of the second dual-mode Bluetooth device.

10. The dual-mode Bluetooth device according to claim 8, wherein the attribute information further comprises a searchable status of the classic Bluetooth of the second dual-mode Bluetooth device, and the at least one processor is configured to:
- determine a second status of the classic Bluetooth of the second dual-mode Bluetooth device according to the attribute information;
- prompt, according to the second status of the classic Bluetooth of the second dual-mode Bluetooth device, a user to operate the dual-mode Bluetooth device or the second dual-mode Bluetooth device to establish a classic Bluetooth connection between the dual-mode Bluetooth device and the second dual-mode Bluetooth device, comprises:
  - in response to the classic Bluetooth of the second dual-mode Bluetooth device being unable to be be searched, prompt the user to set the classic Bluetooth of the second dual-mode Bluetooth device to a searchable state.

11. The dual-mode Bluetooth device according to claim 8, wherein the attribute information comprises a connectable status of the classic Bluetooth of the second dual-mode Bluetooth device, and the at least one processor is configured to:
    determine a second status of the classic Bluetooth of the second dual-mode Bluetooth device according to the attribute information;
    prompt, according to the second status of the classic Bluetooth of the second dual-mode Bluetooth device, a user to operate the dual-mode Bluetooth device or the second dual-mode Bluetooth device to establish a classic Bluetooth connection between the dual-mode Bluetooth device and the second dual-mode Bluetooth device, comprises:
        in response to the classic Bluetooth of the second dual-mode Bluetooth device being unable to be be connected, prompt the user to set the classic Bluetooth of the second dual-mode Bluetooth device to a connectable state.

12. The dual-mode Bluetooth device according to claim 8, wherein the attribute information further comprises application program information of classic Bluetooth of a second dual-mode Bluetooth device, and the at least one processor is further configured to:
    determine, according to the application program information, an application program corresponding to the classic Bluetooth of the second dual-mode Bluetooth device, wherein the application program is used to connect the dual-mode Bluetooth device to the second dual-mode Bluetooth device; and
    prompt, on an operation interface of the dual-mode Bluetooth device, the user to open the application program corresponding to the classic Bluetooth of the second dual-mode Bluetooth device.

13. The dual-mode Bluetooth device according to claim 12, wherein the application program corresponding to the classic Bluetooth of the second dual-mode Bluetooth device is not installed in the dual-mode Bluetooth device, and before prompting, on the operation interface of the dual-mode Bluetooth device, the user to open the application program corresponding to the classic Bluetooth of the second dual-mode Bluetooth device, the at least one processor is further configured to prompt the user to download and install the application program corresponding to the classic Bluetooth of the second dual-mode Bluetooth device.

14. The dual-mode Bluetooth device according to claim 8, wherein the transceiver is further configured to send another BLE advertising packet to second Bluetooth device, and wherein the another BLE advertising packet comprises attribute information of classic Bluetooth of the dual-mode Bluetooth device.

\* \* \* \* \*

UNITED STATES PATENT AND TRADEMARK OFFICE
CERTIFICATE OF CORRECTION

| | | |
|---|---|---|
| PATENT NO. | : 10,939,490 B2 | Page 1 of 1 |
| APPLICATION NO. | : 16/313801 | |
| DATED | : March 2, 2021 | |
| INVENTOR(S) | : Jiaxin Li et al. | |

It is certified that error appears in the above-identified patent and that said Letters Patent is hereby corrected as shown below:

On the Title Page

Column 2, in Line 4 of the Abstract, delete "low energy BLE" and insert -- low energy (BLE) --, therefor.

In the Claims

In Column 28, Line 62, in Claim 10, delete "be be" and insert -- be --, therefor.

In Column 29, Line 15, in Claim 11, delete "be be" and insert -- be --, therefor.

Signed and Sealed this
Twenty-first Day of September, 2021

Drew Hirshfeld
*Performing the Functions and Duties of the
Under Secretary of Commerce for Intellectual Property and
Director of the United States Patent and Trademark Office*